United States Patent
Sun et al.

(10) Patent No.: US 12,477,380 B2
(45) Date of Patent: Nov. 18, 2025

(54) UPLINK PDR GENERATION METHOD, APPARATUS, AND SYSTEM

(71) Applicant: HUAWEI TECHNOLOGIES CO., LTD., Shenzhen (CN)

(72) Inventors: Haiyang Sun, Beijing (CN); Yan Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 532 days.

(21) Appl. No.: 17/826,991

(22) Filed: May 27, 2022

(65) Prior Publication Data

US 2022/0286901 A1  Sep. 8, 2022

Related U.S. Application Data

(63) Continuation of application No. PCT/CN2019/122200, filed on Nov. 29, 2019.

(51) Int. Cl.
*H04W 28/02* (2009.01)
*H04W 80/10* (2009.01)

(52) U.S. Cl.
CPC ... *H04W 28/0268* (2013.01); *H04W 28/0231* (2013.01); *H04W 80/10* (2013.01)

(58) Field of Classification Search
CPC ......... H04W 28/0268; H04W 28/0231; H04W 80/10; H04L 65/1016; H04L 65/1069; H04L 65/80
See application file for complete search history.

(56) References Cited

U.S. PATENT DOCUMENTS

2019/0132251 A1* 5/2019 Dao .................. H04L 69/22

FOREIGN PATENT DOCUMENTS

| CN | 109151913 A | 1/2019 | |
|---|---|---|---|
| EP | 3949270 B1 * | 2/2024 | ............ H04M 15/66 |
| WO | 2018232605 A1 | 12/2018 | |

OTHER PUBLICATIONS

TS 123.501, v15.7.0 (Oct. 2019) 5G; System Architecture for the 5G System (5GS) (3GPP TS 23.501 version 15.7.0 Release 15) (Year: 2019).*

(Continued)

*Primary Examiner* — Huy D Vu
*Assistant Examiner* — Robert Ma
(74) *Attorney, Agent, or Firm* — HAUPTMAN HAM, LLP

(57) ABSTRACT

Embodiments of this application provide an uplink PDR generation method, an apparatus, and a system, to resolve a problem in a conventional technology that an uplink data packet may be discarded because a PCF network element may not include uplink SDF information when generating a PCC rule including an RQC indication. The method includes: A session management network element receives a first policy and charging control PCC rule from a policy control network element, where the first PCC rule includes downlink service data flow SDF information that corresponds to a first service. When the first PCC rule includes a reflective quality of service control RQC indication, the session management network element generates, according to the first PCC rule, a first uplink PDR that corresponds to the first service. The session management network element sends, to a user plane network element, the first uplink PDR that corresponds to the first service.

20 Claims, 13 Drawing Sheets

(56) References Cited

OTHER PUBLICATIONS

TS 129.512, v15.1.0 (Oct. 2018) 5G; 5G System; Session Management Policy Control Service; Stage 3 (3GPP TS 29.512 version 15.1.0 Release 15) (Year: 2018).*
Huawei et al, "Reflective QoS", 3GPP TSG-SA WG2 Meeting #136 S2-1912053, Nov. 22, 2019,total 5 pages.
Huawei et al, "Reflective QoS", 3GPP TSG-SA WG2 Meeting #136 S2-1911676, Nov. 8, 2019,total 5 pages.
3GPP TS 23.501 V15.6.0:"3rd Generation Partnership Project;Technical Specification Group Services and System Aspects;System Architecture for the 5G System;Stage 2(Release 15)",Jun. 2019,total 243 pages.
3GPP TS 29.244 V16.1.0:"3rd Generation Partnership Project;Technical Specification Group Core Network and Terminals;Interface between the Control Plane and the User Plane Nodes;Stage 3(Release 16),"Sep. 2019,total 243 pages.
International Search Report issued in corresponding International Application No. PCT/CN2019/122200, dated Aug. 20, 2020, pp. 1-10.
Qualcomm Incorporated: "Signalling the QoS Flow level QoS parameters of the Alternative QoS profile to UE", 3GPP Draft; S2-1909580,Oct. 4, 2019, XP051801780, total 6 pages.
Extended European Search Report issued in corresponding European Application No. 19954135.0, dated Oct. 17, 2022, pp. 1-11.

* cited by examiner

UPLINK PDR GENERATION METHOD, APPARATUS, AND SYSTEM

CROSS-REFERENCE TO RELATED APPLICATIONS

This application is a continuation of International Patent Application No. PCT/CN2019/122200, filed on Nov. 29, 2019, the disclosure of which is hereby incorporated by reference in its entirety.

TECHNICAL FIELD

This application relates to the field of communication technologies, and in particular, to an uplink packet detection rule (PDR) generation method, an apparatus, and a system.

BACKGROUND

Reflective quality of service (QoS) control means that a terminal device can autonomously generate a QoS rule of a corresponding uplink data packet based on a downlink data packet delivered by a network, and perform QoS control on uplink data according to the corresponding QoS rule. A main objective of introducing a reflective QoS control mechanism is to avoid signaling overheads that are between a session management function (SMF) network element and a terminal device and that are caused by frequently updating a QoS rule. Usually, the reflective QoS control mechanism is applicable to an internet protocol (IP)-type protocol data unit (PDU) session and an Ethernet-type PDU session. The terminal device indicates, to the SMF network element in a PDU session establishment procedure, whether the reflective QoS mechanism is supported.

When a policy control function (PCF) network element is deployed in a 5th generation (5G) network, the PCF network element determines whether the reflective QoS control mechanism is used for a specific service data flow (SDF). Otherwise, the SMF network element determines whether the reflective QoS control is used for the SDF. A scenario in which the PCF network element is deployed is used as an example. When the reflective QoS control is used for the specific SDF, the PCF network element includes a reflective QoS control (RQC) indication in a generated policy and charging control (PCC) rule, to indicate a service to use the reflective QoS control.

However, currently, when the PCF network element generates a PCC rule including an RQC indication, uplink SDF information may not be included. Therefore, the SMF network element does not generate an uplink PDR, and the SMF network element does not deliver the uplink PDR to a UPF network element. In this case, after receiving an uplink data packet of a corresponding service, the UPF network element may not be capable of mapping the uplink data packet to a correct QoS flow for transmission. Consequently, the data packet may be discarded.

SUMMARY

Embodiments of this application provide an uplink PDR generation method, an apparatus, and a system, to resolve a problem in a conventional technology that an uplink data packet may be discarded because a PCF network element may not include uplink SDF information when generating a PCC rule including an RQC indication.

To achieve the foregoing objective, the following technical solutions are used in embodiments of this application.

According to a first aspect, an uplink packet detection rule PDR generation method is provided, where the method includes: A session management network element receives a first policy and charging control PCC rule from a policy control network element, where the first PCC rule includes downlink service data flow SDF information that corresponds to a first service. When the first PCC rule includes a reflective quality of service control RQC indication, the session management network element generates, according to the first PCC rule, a first uplink PDR that corresponds to the first service. The session management network element sends, to a user plane network element, the first uplink PDR that corresponds to the first service. Based on this solution, the user plane network element can obtain the first uplink PDR that corresponds to the first service, so that the following problem is avoided: The user plane network element may not be capable of mapping an uplink data packet of a corresponding service to a correct QoS flow for transmission after receiving the uplink data packet because there is no uplink PDR, and consequently the data packet may be discarded.

In a possible implementation, the first uplink PDR includes a first packet filter set and a first quality of service flow identifier QFI, where the first QFI is the same as a second QFI in a downlink PDR that corresponds to the first service, source information in the first packet filter set is the same as destination information in a second packet filter set in the downlink PDR, and destination information in the first packet filter set is the same as source information in the second packet filter set.

In a possible implementation, the method further includes: The session management network element sends, to the user plane network element, a first usage reporting rule URR that corresponds to the downlink PDR, where the first URR is used to trigger the user plane network element to report a first event, and the first event is that a downlink data packet of the first service is detected according to the downlink PDR. That the session management network element sends, to a user plane network element, the first uplink PDR that corresponds to the first service includes: When the session management network element receives the first event reported by the user plane network element, the session management network element sends, to the user plane network element, the first uplink PDR that corresponds to the first service. In other words, in this embodiment of this application, when learning that the user plane network element detects the downlink data packet of the first service according to the downlink PDR that corresponds to the first service, the session management network element can send, to the user plane network element, the first uplink PDR that corresponds to the first service.

In a possible implementation, the method further includes: The session management network element sends, to the user plane network element, a second URR that corresponds to the downlink PDR, where the second URR is used to trigger the user plane network element to report a third event, and the third event is that no uplink data packet of the first service is detected according to the first uplink PDR. When the session management network element receives the third event reported by the user plane network element, the session management network element notifies the user plane network element to delete the first uplink PDR. Based on this solution, storage resources of the user plane network element can be saved.

In a possible implementation, the method further includes: The session management network element sends, to the user plane network element, a third URR that corresponds to a second uplink PDR, where the third URR is used to trigger the user plane network element to report a second event, the second event is that an uplink data packet of the first service is detected according to the second uplink PDR, and the second uplink PDR is an uplink PDR that corresponds to the first service and that includes the first packet filter set. That the session management network element sends, to a user plane network element, the first uplink PDR that corresponds to the first service includes: When the session management network element receives the second event reported by the user plane network element, the session management network element sends, to the user plane network element, the first uplink PDR that corresponds to the first service. In other words, in this embodiment of this application, when learning that the user plane network element detects the uplink data packet of the first service according to the second uplink PDR including the first packet filter set, the session management network element can send, to the user plane network element, the first uplink PDR that corresponds to the first service.

In a possible implementation, the method further includes: The session management network element sends, to the user plane network element, a fourth URR that corresponds to the second uplink PDR, where the fourth URR is used to trigger the user plane network element to report a third event, and the third event is that no uplink data packet of the first service is detected according to the first uplink PDR. When the session management network element receives the third event reported by the user plane network element, the session management network element notifies the user plane network element to delete the first uplink PDR. Based on this solution, the storage resources of the user plane network element can be saved.

According to a second aspect, an uplink packet detection rule PDR generation method is provided, where the method includes: A session management network element receives a second policy and charging control PCC rule from a policy control network element, where the second PCC rule includes an uplink indication, and the uplink indication is used to indicate to generate an uplink PDR. In response to the uplink indication, the session management network element generates, according to the second PCC rule, a first uplink PDR that corresponds to a first service, and skips generating a quality of service QoS profile and a QoS rule. The session management network element sends, to a user plane network element, the first uplink PDR that corresponds to the first service. Based on this solution, the user plane network element can obtain the first uplink PDR that corresponds to the first service, so that the following problem is avoided: The user plane network element may not be capable of mapping an uplink data packet of a corresponding service to a correct QoS flow for transmission after receiving the uplink data packet because there is no uplink PDR, and consequently the data packet may be discarded.

In a possible implementation, the first uplink PDR includes a first packet filter set and a first quality of service flow identifier QFI, where the first QFI is the same as a QFI in a downlink PDR that corresponds to the first service, source information in the first packet filter set is the same as destination information in a second packet filter set in the downlink PDR, and destination information in the first packet filter set is the same as source information in the second packet filter set.

In a possible implementation, the uplink indication is uplink service data flow SDF information that corresponds to the first service and that is included in the second PCC rule, where source information in the uplink SDF information is the same as destination information in downlink SDF information that corresponds to the first service, and destination information in the uplink SDF information is the same as source information in the downlink SDF information.

In a possible implementation, the uplink indication is a reflective quality of service control RQC indication.

In a possible implementation, the second PCC rule further includes uplink SDF information, where source information in the uplink SDF information is the same as destination information in downlink SDF information that corresponds to the first service, and destination information in the uplink SDF information is the same as source information in the downlink SDF information.

In a possible implementation, the method further includes: The session management network element receives a first PCC rule from the policy control network element, where the first PCC rule includes the downlink SDF information that corresponds to the first service. The session management network element generates, according to the first PCC rule, the downlink PDR that corresponds to the first service. Based on this solution, the session management network element can obtain the downlink PDR that corresponds to the first service.

According to a third aspect, an uplink packet detection rule PDR generation method is provided, where the method includes: A user plane network element detects that a first service needs to use reflective quality of service QoS control. When there is no first uplink PDR that corresponds to the first service, the user plane network element sends a first message to a session management network element, where the first message is used to trigger the session management network element to send the first uplink PDR that corresponds to the first service. The user plane network element receives the first uplink PDR that corresponds to the first service from the session management network element. Based on this solution, the user plane network element can obtain the first uplink PDR that corresponds to the first service, so that the following problem is avoided: The user plane network element may not be capable of mapping an uplink data packet of a corresponding service to a correct QoS flow for transmission after receiving the uplink data packet because there is no uplink PDR, and consequently the data packet may be discarded.

In a possible implementation, the first uplink PDR includes a first packet filter set and a first quality of service flow identifier QFI, where the first QFI is the same as a QFI in a downlink PDR that corresponds to the first service, source information in the first packet filter set is the same as destination information in a second packet filter set in the downlink PDR, and destination information in the first packet filter set is the same as source information in the second packet filter set.

In a possible implementation, the method further includes: The user plane network element receives indication information from the session management network element, where the indication information is used to indicate to report an event in which there is no uplink PDR. Based on this solution, the user plane network element can report the first message to the session management network element when there is no uplink PDR.

According to a fourth aspect, an uplink packet detection rule PDR generation method is provided, where the method includes: A session management network element receives a first message from a user plane network element, where the first message is used to trigger the session management network element to send a first uplink PDR that corresponds to a first service. The session management network element obtains the first uplink PDR that corresponds to the first service. The session management network element sends, to the user plane network element, the first uplink PDR that corresponds to the first service. Based on this solution, the user plane network element can obtain the first uplink PDR that corresponds to the first service, so that the following problem is avoided: The user plane network element may not be capable of mapping an uplink data packet of a corresponding service to a correct QoS flow for transmission after receiving the uplink data packet because there is no uplink PDR, and consequently the data packet may be discarded.

In a possible implementation, the first uplink PDR includes a first packet filter set and a first quality of service flow identifier QFI, where the first QFI is the same as a QFI in a downlink PDR that corresponds to the first service, source information in the first packet filter set is the same as destination information in a second packet filter set in the downlink PDR, and destination information in the first packet filter set is the same as source information in the second packet filter set.

In a possible implementation, that the session management network element obtains the first uplink PDR that corresponds to the first service includes: The session management network element generates the first uplink PDR that corresponds to the first service. Based on this solution, the session management network element can obtain the first uplink PDR that corresponds to the first service.

In a possible implementation, that the session management network element obtains the first uplink PDR that corresponds to the first service includes: The session management network element sends a second message to a policy control network element, where the second message is used to notify the policy control network element that the user plane network element does not have the first uplink PDR that corresponds to the first service. The session management network element receives a second policy and charging control PCC rule from the policy control network element, where the second PCC rule includes an uplink indication, and the uplink indication is used to indicate to generate an uplink PDR. In response to the uplink indication, the session management network element generates, according to the second PCC rule, the first uplink PDR that corresponds to the first service, and skips generating a QoS profile and a QoS rule. Based on this solution, the session management network element can obtain the first uplink PDR that corresponds to the first service.

In a possible implementation, the method further includes: The session management network element sends indication information to the user plane network element, where the indication information is used to indicate to report an event in which there is no uplink PDR. Based on this solution, the user plane network element can report the first message to the session management network element when there is no uplink PDR.

In a possible implementation, the method further includes: The session management network element sends a third message to a network repository function network element, where the third message includes uplink PDR generation capability information of a target user plane network element in a reflective QoS control mechanism, and the generation capability information represents that the target user plane network element has a capability of detecting that a service needs to use reflective QoS control. The session management network element receives a list of target user plane network elements from the network repository function network element, where the list of target user plane network elements includes the user plane network element. The session management network element selects, from the list of target user plane network elements, the user plane network element to serve a session in which the first service is located. Based on this solution, a user plane network element that has the capability of detecting that the service needs to use the reflective QoS control can be selected for the session in which the first service is located.

According to a fifth aspect, a communication apparatus is provided to implement the foregoing methods. The communication apparatus may be the session management network element in the first aspect, the second aspect, or the fourth aspect, or an apparatus including the session management network element. Alternatively, the communication apparatus may be the user plane network element in the third aspect, or an apparatus including the user plane network element. The communication apparatus includes a corresponding module, unit, or means for implementing the foregoing methods. The module, unit, or means may be implemented by hardware or software, or implemented by hardware executing corresponding software. The hardware or the software includes one or more modules or units corresponding to the foregoing functions.

According to a sixth aspect, a communication apparatus is provided, including a processor and a memory, where the memory is configured to store computer instructions. When the processor executes the instructions, the communication apparatus is enabled to perform the method according to any one of the foregoing aspects. The communication apparatus may be the session management network element in the first aspect, the second aspect, or the fourth aspect, or an apparatus including the session management network element. Alternatively, the communication apparatus may be the user plane network element in the third aspect, or an apparatus including the user plane network element.

According to a seventh aspect, a communication apparatus is provided, including a processor. The processor is configured to: after being coupled to a memory and reading instructions in the memory, perform, according to the instructions, the method according to any one of the foregoing aspects. The communication apparatus may be the session management network element in the first aspect, the second aspect, or the fourth aspect, or an apparatus including the session management network element. Alternatively, the communication apparatus may be the user plane network element in the third aspect, or an apparatus including the user plane network element.

According to an eighth aspect, a computer-readable storage medium is provided. The computer-readable storage medium stores instructions. When the instructions are executed on a computer, the computer is enabled to perform the method according to any one of the foregoing aspects.

According to a ninth aspect, a computer program product including instructions is provided. When the computer program product runs on a computer, the computer is enabled to perform the method according to any one of the foregoing aspects.

According to a tenth aspect, a communication apparatus (for example, the communication apparatus may be a chip or a chip system) is provided. The communication apparatus includes a processor, where the processor is configured to implement a function in any one of the foregoing aspects. In a possible implementation, the communication apparatus further includes a memory. The memory is configured to store program instructions and data that are necessary. When the communication apparatus is a chip system, the communication apparatus may include a chip, or may include the chip and another discrete component.

For technical effects brought by any design in the fifth aspect to the tenth aspect, refer to technical effects brought by different designs in the first aspect to the fourth aspect. Details are not described herein again.

According to an eleventh aspect, a communication method is provided, where the method includes: A policy control network element sends a first policy and charging control PCC rule to a session management network element, where the first PCC rule includes downlink service data flow SDF information that corresponds to a first service. The session management network element receives the first PCC rule from the policy control network element; and when the first PCC rule includes a reflective quality of service control RQC indication, generates, according to the first PCC rule, a first uplink PDR that corresponds to the first service. The session management network element sends, to a user plane network element, the first uplink PDR that corresponds to the first service. For a technical effect of the eleventh aspect, refer to the first aspect. Details are not described herein again.

According to a twelfth aspect, a communication method is provided, where the method includes: A policy control network element sends a second policy and charging control PCC rule to a session management network element, where the second PCC rule includes an uplink indication, and the uplink indication is used to indicate to generate an uplink PDR. The session management network element receives the second PCC rule from the policy control network element, and in response to the uplink indication, generates, according to the second PCC rule, a first uplink PDR that corresponds to a first service, and skip generating a quality of service QoS profile and a QoS rule. The session management network element sends, to a user plane network element, the first uplink PDR that corresponds to the first service. For a technical effect of the twelfth aspect, refer to the second aspect. Details are not described herein again.

According to a thirteenth aspect, a communication method is provided, where the method includes: When there is no first uplink PDR that corresponds to a first service, and after detecting that the first service needs to use QoS control, a user plane network element sends a first message to a session management network element, where the first message is used to trigger the session management network element to send the first uplink PDR that corresponds to the first service. After receiving the first message from the user plane network element and obtaining the first uplink PDR that corresponds to the first service, the session management network element sends, to the user plane network element, the first uplink PDR that corresponds to the first service. For a technical effect of the thirteenth aspect, refer to the third aspect or the fourth aspect. Details are not described herein again.

According to a fourteenth aspect, a communication system is provided. The communication system includes a session management network element and a policy control network element. The policy control network element is configured to send a first policy and charging control PCC rule to the session management network element, where the first PCC rule includes downlink service data flow SDF information that corresponds to a first service. The session management network element is configured to: receive the first PCC rule from the policy control network element; and when the first PCC rule includes a reflective quality of service control RQC indication, generate, according to the first PCC rule, a first uplink PDR that corresponds to the first service. The session management network element is further configured to send, to a user plane network element, the first uplink PDR that corresponds to the first service. For a technical effect of the fourteenth aspect, refer to the first aspect. Details are not described herein again.

According to a fifteenth aspect, a communication system is provided. The communication system includes a session management network element and a policy control network element. The policy control network element is configured to send a second policy and charging control PCC rule to the session management network element, where the second PCC rule includes an uplink indication, and the uplink indication is used to indicate to generate an uplink PDR. The session management network element is configured to: receive the second PCC rule from the policy control network element, and in response to the uplink indication, generates, according to the second PCC rule, a first uplink PDR that corresponds to a first service, and skip generating a quality of service QoS profile and a QoS rule. The session management network element is further configured to send, to a user plane network element, the first uplink PDR that corresponds to the first service. For a technical effect of the fifteenth aspect, refer to the second aspect. Details are not described herein again.

According to a sixteenth aspect, a communication system is provided. The communication system includes a user plane network element and a session management network element. The user plane network element is configured to: when there is no first uplink PDR that corresponds to a first service, and after detecting that the first service needs to use QoS control, send a first message to the session management network element, where the first message is used to trigger the session management network element to send the first uplink PDR that corresponds to the first service. The session management network element is configured to: After receiving the first message from the user plane network element and obtaining the first uplink PDR that corresponds to the first service, send, to the user plane network element, the first uplink PDR that corresponds to the first service. For a technical effect of the sixteenth aspect, refer to the third aspect or the fourth aspect. Details are not described herein again.

DESCRIPTION OF EMBODIMENTS

For ease of understanding solutions in embodiments of this application, related concepts are first briefly described as follows.
(1) PDU Session:
The PDU session is an association between a terminal device and a data network (data network, DN), and is used to provide a PDU connection service.
(2) QoS Parameter:
The QoS parameter in embodiments of this application includes one or more of the following parameters:
1. 5G QoS Identifier (5QI)
The 5QI is a scalar to be indexed to a corresponding 5G QoS characteristic. The 5QI is classified into a standardized 5QI, a preconfigured 5QI, and a dynamically allocated 5QI. The standardized SQIs are in a one-to-one correspondence with a group of standardized 5G QoS characteristic values. A 5G QoS characteristic value that corresponds to the preconfigured 5QI is preconfigured on a radio access network (RAN) device. A 5G QoS characteristic that corresponds to the dynamically allocated 5QI is sent by a core network device to the RAN device by using a QoS profile.
2. Allocation and Retention Priority (ARP)
The ARP includes a priority level, a preemption capability, and a preemption vulnerability.
3. Guaranteed Flow Bit Rate (GFBR)
The GFBR represents a bit rate that is expected to be provided for a guaranteed bit rate (GBR) QoS flow.
4. Maximum Flow Bit Rate (MFBR)
The MFBR is used to limit a bit rate provided for a GBR QoS flow, namely, a maximum bit rate provided for the GBR QoS flow. If the bit rate is exceeded, a data packet can be discarded.

Figure 1:
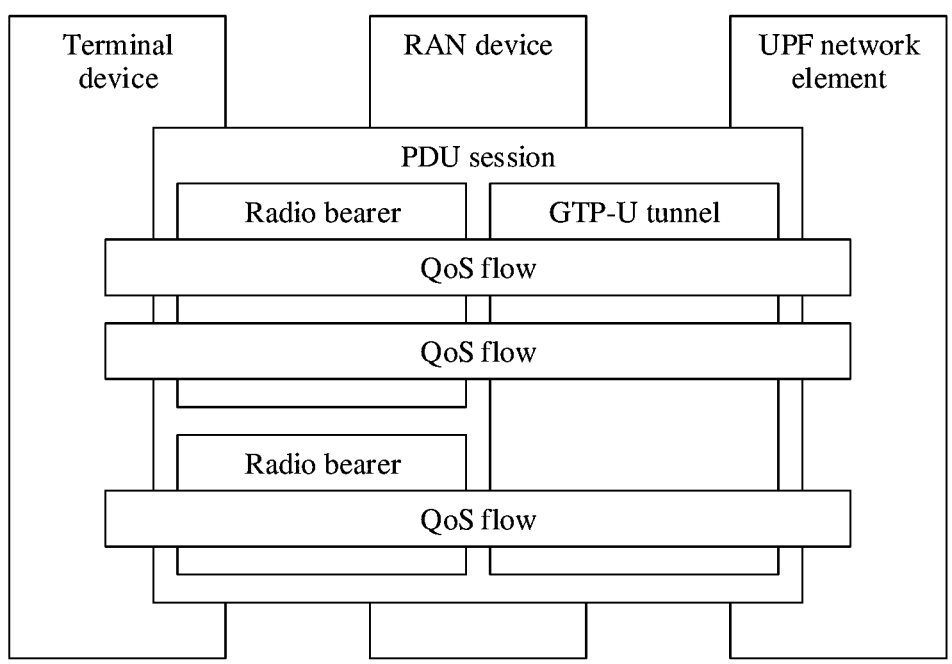
FIG. 1 shows an existing 5G QoS model.

5. Reflective QoS Attribute (RQA)
The RQA is used to indicate a service transmitted by using a corresponding QoS flow to use reflective QoS.
6. QoS Notification Control (QNC)
The QNC is used to indicate a RAN device whether to notify a network side in a use period of a QoS flow when a GFBR cannot be met.
(3) QoS Model:
In a 5G system, to ensure end-to-end quality of service of a service, a 5G QoS model based on a QoS flow is proposed, and is shown in FIG. 1. The 5G QoS model supports a guaranteed bit rate QoS flow (namely, a GBR QoS flow) and a non-guaranteed bit rate QoS flow (namely, a non-GBR QoS flow). Same transmission processing (such as scheduling or an admission threshold) is performed on data packets controlled by using a same QoS flow.

As shown in FIG. 1, a terminal device may establish one or more PDU sessions with a 5G network. One or more QoS flows can be established in each PDU session. One QoS flow is identified by one QoS flow identifier (QFI), in other words, the QFI uniquely identifies one QoS flow in a session. One PDU session is in a one-to-one correspondence with one general packet radio service (GPRS) tunneling protocol user plane (GTP-U) tunnel between a RAN device and a UPF network element. One QoS flow corresponds to one radio bearer that is between the terminal device and the RAN device, and one radio bearer may correspond to one or more QoS flows.

Whether a QoS flow is a GBR QoS flow or a non-GBR QoS flow is determined based on a corresponding QoS profile.

For the GBR QoS flow, a corresponding QoS profile includes the following QoS parameters: a 5QI, an ARP, a GFBR, and an MFBR, and optionally includes a QNC. The GBR QoS flow is classified into a GBR QoS flow that requires notification control and a GBR QoS flow that does not require notification control, depending on whether the QoS profile includes the QNC. For the GBR QoS flow that requires notification control, when an access network device detects that a corresponding QoS flow resource cannot be met, the access network device notifies a session management function (SMF) network element of the event. Further, the SMF network element may initiate a QoS flow deletion or modification procedure.

For the non-GBR QoS flow, a corresponding QoS profile includes the following QoS parameters: a 5QI and an ARP, and optionally includes an RQA.

Figure 2:
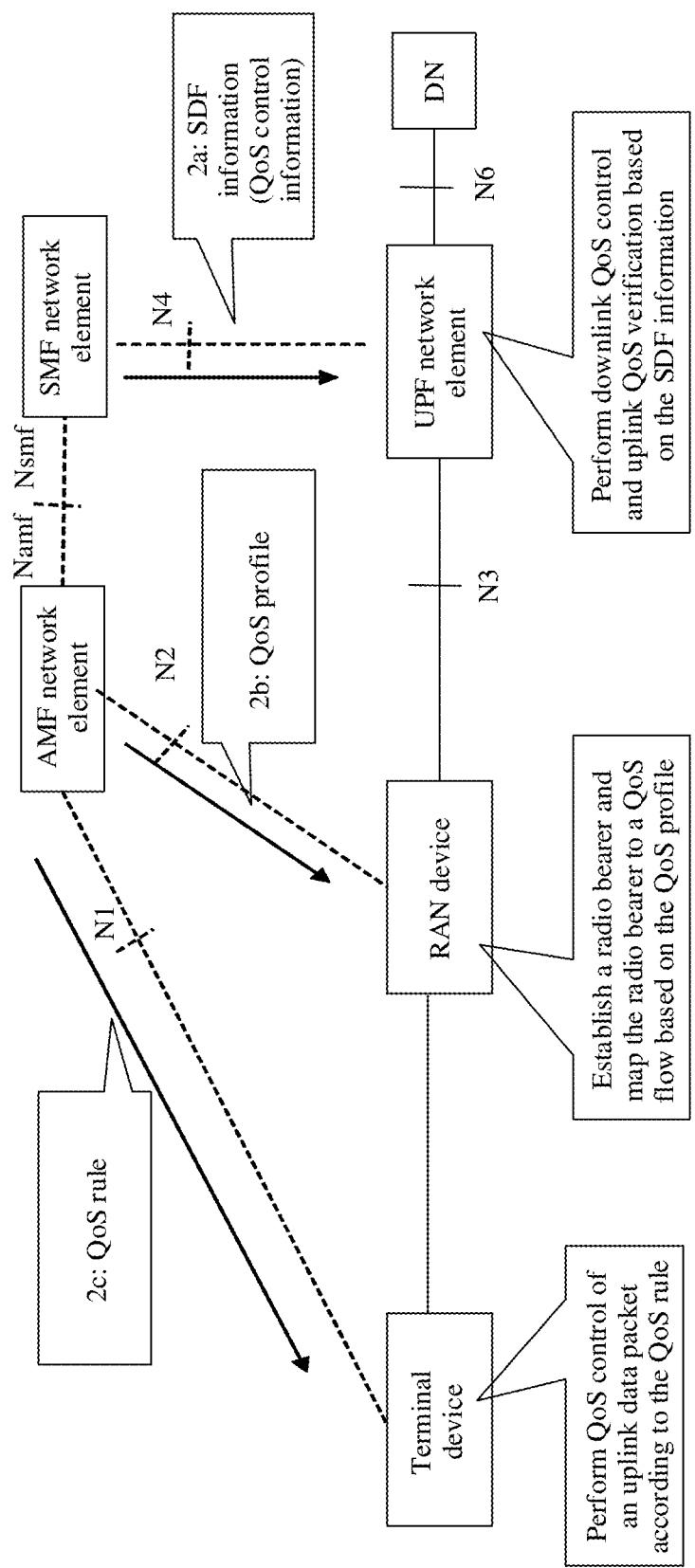
FIG. 2 is a schematic diagram of an existing architecture of establishing a signaling-based QoS flow.

In addition, the GBR QoS flow is mainly controlled in a signaling-based manner. A corresponding QoS flow establishment procedure is shown in FIG. 2, and includes the following steps:
Step 1: An SMF network element determines, according to a local policy or a PCC rule sent by a PCF network element, to establish a QoS flow. (2a) The SMF network element sends SDF information to a UPF network element, where the SDF information includes QoS control information. (2b) The SMF network element sends a QoS profile of the QoS flow to a RAN device via an access and mobility management function (AMF) network element. (2c) The SMF network element sends a QoS rule to a terminal device via the AMF network element and the RAN device, where the QoS rule includes the QoS control information.
Step 2: The QoS flow is established among the terminal device, the RAN device, and the UPF network element. The RAN device establishes an air interface radio bearer based on the QoS profile, and stores a binding relationship between a QoS flow and a radio bearer.

For downlink, when receiving a downlink data packet, the UPF network element includes a QFI in a data packet header of the downlink data packet based on the SDF information sent by the SMF network element. When receiving the downlink data packet, the RAN device transmits the downlink data packet on a corresponding radio bearer based on the QFI in the data packet header and the corresponding binding relationship between a QoS flow and a radio bearer.

For uplink, when determining to send an uplink data packet, the terminal device determines a QoS flow according to the QoS rule, includes a QFI in a data packet header of the to-be-sent uplink data packet, and transmits the uplink data packet on a corresponding radio bearer based on the binding relationship between a QoS flow and a radio bearer. When receiving the uplink data packet, the RAN device includes a QFI in a data packet header of an uplink data packet between the RAN device and the UPF network element based on the QFI in the data packet header. When receiving the uplink data packet sent by the RAN device, the UPF network element verifies whether the data packet is transmitted through a correct QoS flow.

(4) Reflective QoS Control:

Refer to the background for a definition of the reflective QoS control. Details are not described herein again.

Figure 3:
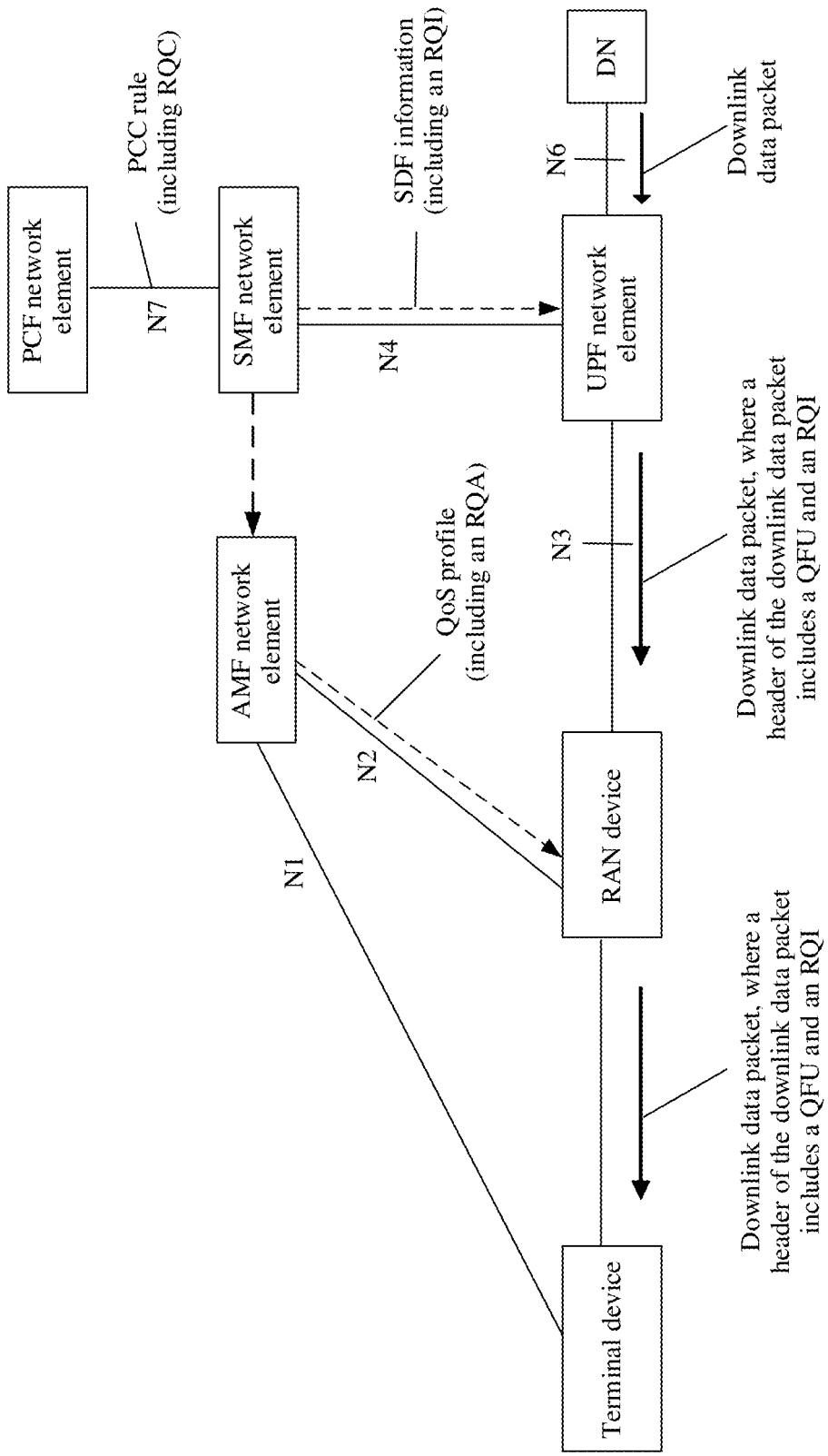
FIG. 3 is a schematic flowchart of reflective QoS control according to an embodiment of this application.

A scenario in which a PCF network element is deployed is used as an example. As shown in FIG. 3, when the reflective QoS control is used for a specific SDF, the PCF network element includes an RQC indication in a generated PCC rule, to indicate a service to use the reflective QoS control. Further, an SMF network element determines, based on the received RQC indication, that SDF information provided for a UPF network element includes a reflective QoS indication (RQI), and includes a reflective QoS attribute (RQA) in a QoS profile sent to a RAN device.

The UPF network element configures, in a GTP-U encapsulation header, an RQI for a downlink data packet that corresponds to each SDF. When the downlink data packet received by the RAN device includes the RQI, the RAN device indicates a QFI and the RQI of the downlink data packet to a terminal device. When a terminal device side receives a downlink data packet including RQI, the following operations are performed.

If there is no packet filter that corresponds to the downlink data packet in a QoS rule derived by the terminal device, the terminal device creates a new derived QoS rule, where the QoS rule includes the packet filter that corresponds to the downlink data packet. In addition, the terminal device starts a timer for the derived QoS rule.

If there is a packet filter that corresponds to the downlink data packet in a QoS rule derived by the terminal device, the terminal device refreshes a timer that corresponds to the derived QoS rule. Further, if the QFI that corresponds to the downlink data packet is different from a derived QoS rule, the terminal device updates a QFI in the derived QoS rule.

When a network side determines that the reflective QoS control is no longer used for the specific SDF, the SMF network element deletes the RQI in the SDF information provided for the UPF network element. The UPF network element no longer configures the RQI in the GTP-U encapsulation header, and the UPF network element continues to receive an uplink service that corresponds to the SDF within a period of time. The terminal device deletes, based on the timer, the QoS rule derived by the terminal device.

(5) PDR:

The PDR in embodiments of this application includes an uplink PDR and a downlink PDR. The PDR is transmitted by an SMF network element to a UPF network element through an N4 interface. The UPF network element uses the PDR to detect a packet in a transmission direction, for example, uses the uplink PDR to detect a packet in an uplink transmission direction, and uses the downlink PDR to detect a packet in a downlink transmission direction.

The PDR includes a packet filter set and a QFI. For a PDU session of IP type, the packet filter set includes but is not limited to one or more of the following:

a source/destination IP address or source/destination IP version 6 (IPv6) prefix;

a source/destination port number;

a protocol ID of the protocol above IP; or a packet filter direction.

For a PDU session of Ethertype, the packet filter set includes but is not limited to one or more of the following:

a source/destination media access control (MAC) address;

an Ethertype; or a packet filter direction.

It should be noted that the foregoing merely provides some parameters in the packet filter set as an example. Certainly, the packet filter set further includes another parameter. For details, refer to the conventional technology. Details are not described herein.

In addition, the PDR in embodiments of this application may further include a parameter such as an N4 session identifier (N4 session ID), a rule identifier (rule ID), or a precedence. For details, refer to the conventional technology. This is not specifically limited in embodiments of this application.

The following describes the technical solutions in embodiments of this application with reference to the accompanying drawings in embodiments of this application. In descriptions of this application, unless otherwise specified, "/" represents an "or" relationship between associated objects. For example, A/B may represent A or B. In this application, "and/or" describes only an association relationship between associated objects and represents that three relationships may exist. For example, A and/or B may represent the following three cases: Only A exists, both A and B exist, and only B exists, where A or B may be singular or plural. In addition, in the descriptions of this application, unless otherwise specified, "a plurality of" means two or more than two. "At least one of the following" or a similar expression thereof means any combination of these items, and includes a singular item or any combination of plural items. For example, at least one of a, b, or c may indicate: a, b, c, a and b, a and c, b and c, or a, b, and c, where a, b, and c may be singular or plural. In addition, to clearly describe the technical solutions in embodiments of this application, words such as "first" and "second" are used in embodiments of this application to distinguish between same items or similar items that have basically the same functions or purposes. A person skilled in the art may understand that the words such as "first" and "second" do not limit a quantity and an execution sequence, and the words such as "first" and "second" do not indicate a definite difference. In addition, in embodiments of this application, the word such as "example" or "for example" is used to represent giving an example, an illustration, or a description. Any embodiment or design scheme described as an "example" or with "for example" in embodiments of this application should not be explained as being more preferred or having more advantages than another embodiment or design scheme. Exactly, use of the word such as "example" or "for example" is intended to present a relative concept in a specific manner for ease of understanding.

In addition, network architectures and service scenarios described in embodiments of this application are intended to describe the technical solutions in embodiments of this application more clearly, and do not constitute any limitation on the technical solutions provided in embodiments of this application. A person of ordinary skill in the art may learn that with evolution of the network architectures and emergence of new service scenarios, the technical solutions provided in embodiments of this application are also applicable to resolving similar technical problems.

Figure 4:
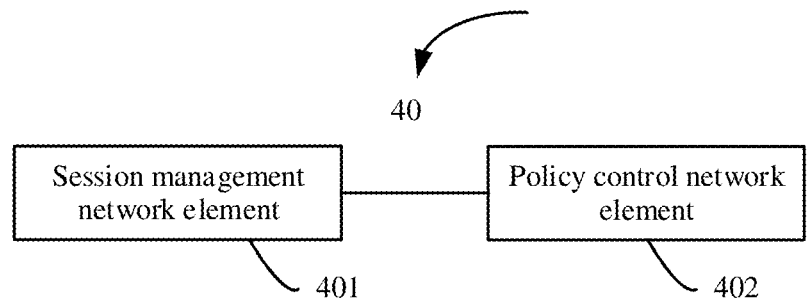
FIG. 4 is a schematic diagram of a structure of a communication system according to an embodiment of this application.

FIG. 4 shows a communication system 40 according to an embodiment of this application. The communication system 40 includes a session management network element 401 and a policy control network element 402. The session management network element 401 may directly communicate with the policy control network element 402, or may communicate with the policy control network element 402 through forwarding by another device. This is not specifically limited in this embodiment of this application.

In a possible implementation, the policy control network element 402 is configured to send a first PCC rule to the session management network element 401, where the first PCC rule includes downlink SDF information that corresponds to a first service. The session management network element 401 is configured to: receive the first PCC rule from the policy control network element 402; and when the first PCC rule includes an RQC indication, generate, according to the first PCC rule, a first uplink PDR that corresponds to the first service; and further send the first uplink PDR that corresponds to the first service to a user plane network element. Specific implementation of the foregoing solution is described in detail in subsequent method embodiments. Details are not described herein.

In another possible implementation, the policy control network element 402 is configured to send a second PCC rule to the session management network element 401, where the second PCC rule includes an uplink indication, and the uplink indication is used to indicate to generate an uplink PDR. The session management network element 401 is configured to: receive the second PCC rule from the policy control network element 402; in response to the uplink indication, generate, according to the second PCC rule, a first uplink PDR that corresponds to a first service, and skip generating a QoS profile and a QoS rule; and further send, to a user plane network element, the first uplink PDR that corresponds to the first service. Specific implementation of the foregoing solution is described in detail in subsequent method embodiments. Details are not described herein.

Based on the communication system provided in this embodiment of this application, the user plane network element can obtain the first uplink PDR that corresponds to the first service, so that the following problem is avoided: The user plane network element may not be capable of mapping an uplink data packet of a corresponding service to a correct QoS flow for transmission after receiving the uplink data packet because there is no uplink PDR, and consequently the data packet may be discarded.

Figure 5:
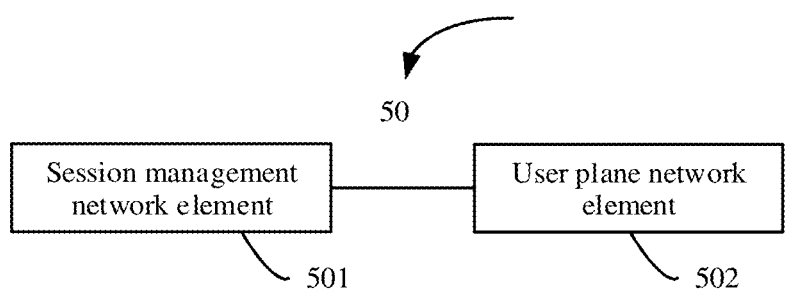
FIG. 5 is a schematic diagram of a structure of another communication system according to an embodiment of this application.

FIG. 5 shows another communication system 50 according to an embodiment of this application. The communication system 50 includes a session management network element 501 and a user plane network element 502. The session management network element 501 may directly communicate with the user plane network element 502, or may communicate with the user plane network element 502 through forwarding by another device. This is not specifically limited in this embodiment of this application.

The user plane network element 502 is configured to detect that a first service needs to use QoS control. The user plane network element 502 is further configured to: when there is no first uplink PDR that corresponds to the first service, send a first message to the session management network element 501, where the first message is used to trigger the session management network element 501 to send a first uplink PDR that corresponds to the first service. The session management network element 501 is configured to: after receiving the first message from the user plane network element and obtaining the first uplink PDR that corresponds to the first service, send, to the user plane network element 502, the first uplink PDR that corresponds to the first service. Specific implementation of the foregoing solution is described in detail in subsequent method embodiments. Details are not described herein.

Based on the communication system provided in this embodiment of this application, the user plane network element can obtain the first uplink PDR that corresponds to the first service, so that the following problem is avoided: The user plane network element may not be capable of mapping an uplink data packet of a corresponding service to a correct QoS flow for transmission after receiving the uplink data packet because there is no uplink PDR, and consequently the data packet may be discarded.

Optionally, the communication system 40 shown in FIG. 4 or the communication system 50 shown in FIG. 5 may be used in a currently discussed 5G network, another future network, or the like. This is not specifically limited in embodiments of this application.

Figure 6A:
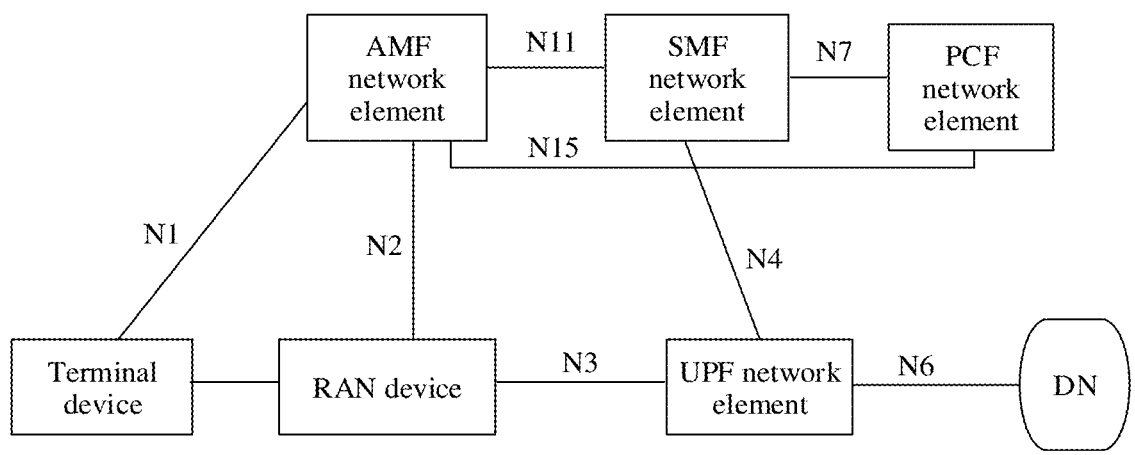
FIG. 6a shows a 5G network architecture 1 in a non-roaming scenario according to an embodiment of this application.

For example, assuming that the communication system 40 shown in FIG. 4 or the communication system 50 shown in FIG. 5 is applied to a 5G network architecture in a non-roaming scenario, as shown in FIG. 6a, a network element or an entity that corresponds to the foregoing session management network element may be an SMF network element in the non-roaming 5G network architecture; a network element or an entity that corresponds to the foregoing policy control network element may be a PCF network element in the non-roaming 5G network architecture; and a network element or an entity that corresponds to the foregoing user plane network element may be a UPF network element in the non-roaming 5G network architecture.

In addition, as shown in FIG. 6a, the non-roaming 5G network architecture may further include an AMF network element, a RAN device, or some other network elements that are not shown, for example, a unified data management (UDM) network element, an authentication server function (AUSF) network element, a network repository function (NRF) network element, or an application function (AF) network element. This is not specifically limited in this embodiment of this application.

A terminal device communicates with the AMF network element through a next generation (N) 1 interface (N1 for short). The RAN device communicates with the AMF network element through an N2 interface (N2 for short). The RAN device communicates with the UPF network element through an N3 interface (N3 for short). The UPF network element communicates with a DN through an N6 interface (N6 for short). The AMF network element communicates with the SMF network element through an N11 interface (N11 for short). The AMF network element communicates with the PCF network element through an N15 interface (N15 for short). The SMF network element communicates with the PCF network element through an N7 interface (N7 for short). The SMF network element communicates with the UPF network element through an N4 interface (N4 for short).

Figure 6B:
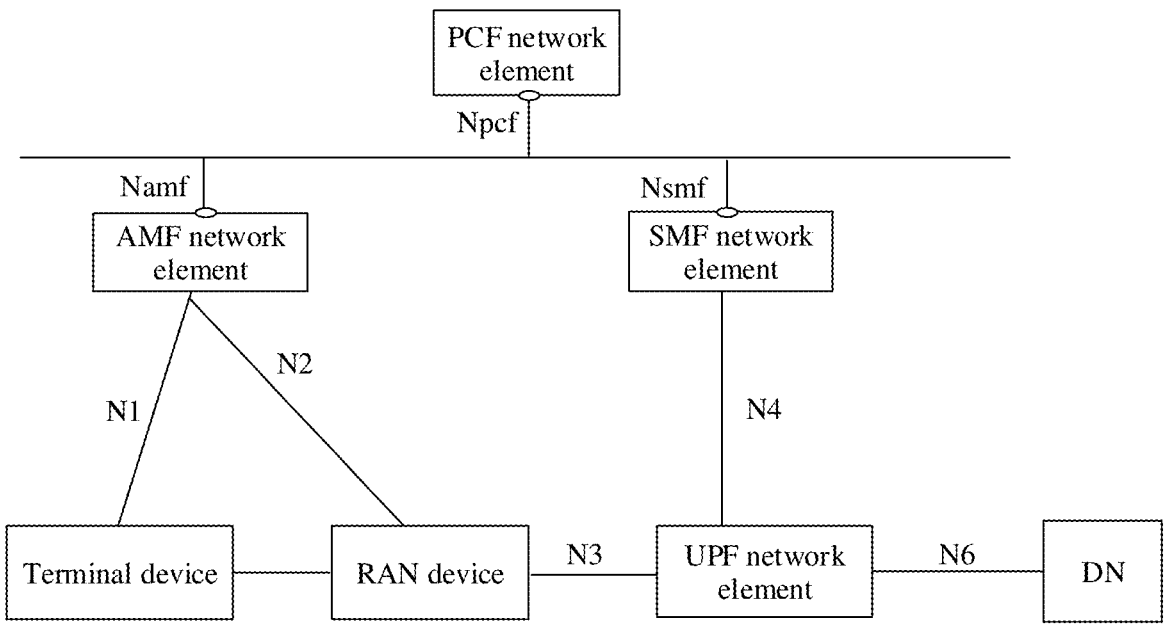
FIG. 6b shows a 5G network architecture 2 in a non-roaming scenario according to an embodiment of this application.

In addition, it should be noted that control plane network elements such as the AMF network element, the SMF network element, and the PCF network element in the non-roaming 5G network architecture shown in FIG. 6a may alternatively interact with each other through a service-based interface. For example, as shown in FIG. 6b, an external service-based interface provided by the AMF network element may be an Namf; an external service-based interface provided by the SMF network element may be an Nsmf; and an external service-based interface provided by the PCF network element may be an Npcf. For related descriptions, refer to a 5G system architecture in the standard 23501. Details are not described herein.

Figure 7A:
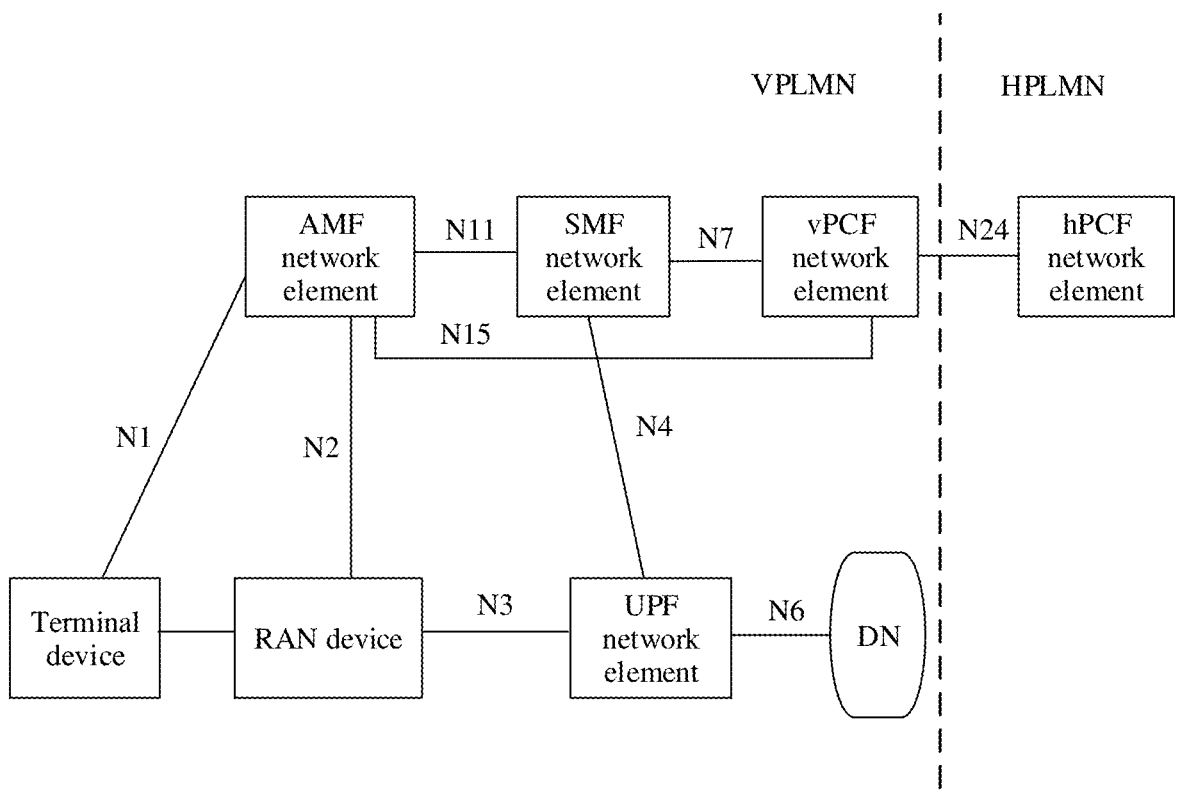
FIG. 7a shows a 5G network architecture 1 in a local breakout roaming scenario according to an embodiment of this application.

Alternatively, for example, assuming that the communication system 40 shown in FIG. 4 or the communication system 50 shown in FIG. 5 is applied to a 5G network architecture in a local breakout roaming scenario, as shown in FIG. 7a, a network element or an entity that corresponds to the foregoing session management network element may be an SMF network element in the local breakout roaming 5G network architecture; a network element or an entity that corresponds to the foregoing policy control network element may be a visited PCF (vPCF) network element in the local breakout roaming 5G network architecture; and a network element or an entity that corresponds to the foregoing user plane network element may be a UPF network element in the local breakout roaming 5G network architecture.

In addition, as shown in FIG. 7a, the local breakout roaming 5G network architecture may further include a RAN device, an AMF network element, a home PCF (hPCF) network element, or the like. This is not specifically limited in this embodiment of this application. The hPCF network element belongs to a home public land mobile network (HPLMN). The RAN device, the AMF network element, the SMF network element, the UPF network element, or the vPCF network element belongs to a visited public land mobile network (VPLMN).

A terminal device communicates with the AMF network element through an N1 interface (N1 for short). The RAN device communicates with the AMF network element through an N2 interface (N2 for short). The RAN device communicates with the UPF network element through an N3 interface (N3 for short). The UPF network element communicates with a DN through an N6 interface (N6 for short). The AMF network element communicates with the SMF network element through an N11 interface (N11 for short). The AMF network element communicates with the vPCF network element through an N15 interface (N15 for short). The SMF network element communicates with the vPCF network element through an N7 interface (N7 for short). The vPCF network element communicates with the hPCF network element through an N24 interface (N24 for short). The SMF network element communicates with the UPF network element through an N4 interface (N4 for short).

Figure 7B:
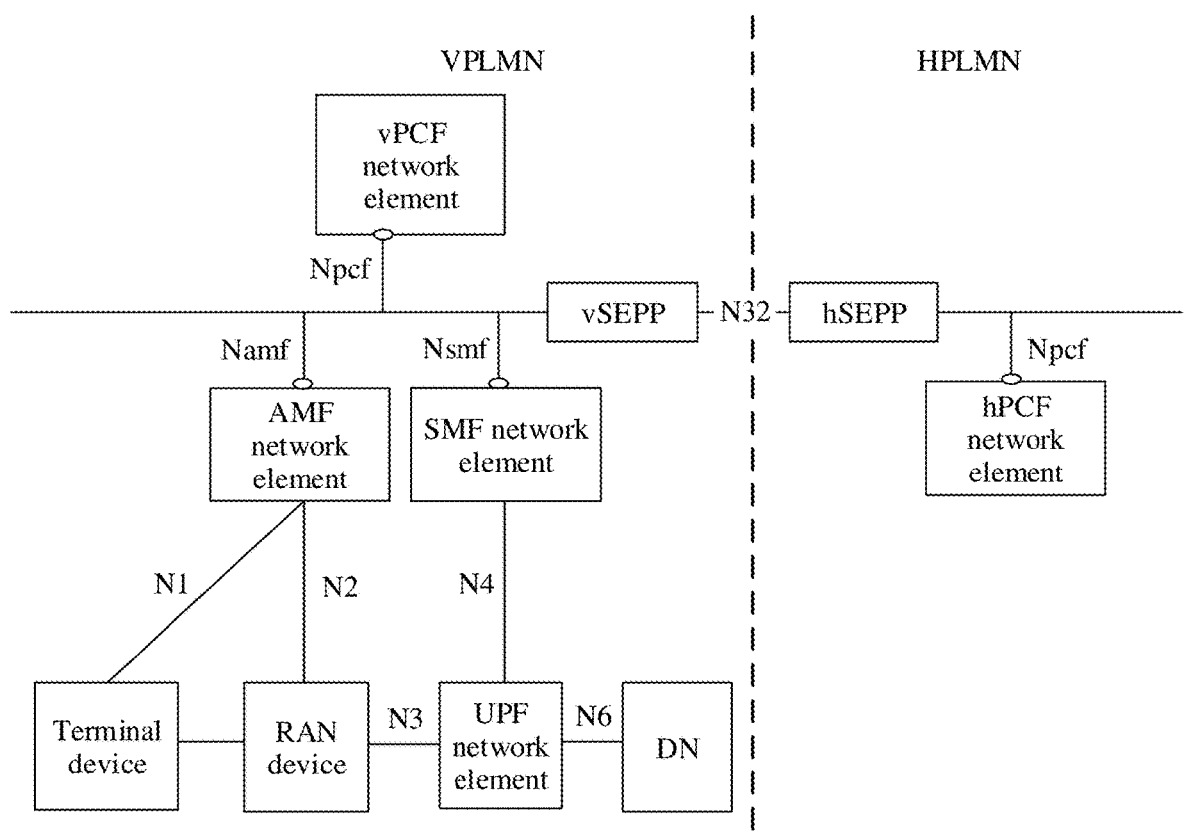
FIG. 7b shows a 5G network architecture 2 in a local breakout roaming scenario according to an embodiment of this application.

In addition, it should be noted that control plane network elements such as the AMF network element, the SMF network element, the vPCF network element, and the hPCF network element in the local breakout roaming 5G network architecture shown in FIG. 7a may alternatively interact with each other through a service-based interface. For example, as shown in FIG. 7b, an external service-based interface provided by the AMF network element may be an Namf; an external service-based interface provided by the SMF network element may be an Nsmf; an external service-based interface provided by the vPCF network element may be an Npcf; and an external service-based interface provided by the hPCF network element may be the Npcf. In addition, a visited security edge protection proxy (vSEPP) in FIG. 7b is configured to perform information filtering, policy control, topology hiding, and the like on a control plane interface in the VPLMN. A home security edge protection proxy (home security edge protection proxy, hSEPP) in FIG. 7b is configured to perform information filtering, policy control, topology hiding, and the like on a control plane interface in the HPLMN. The vSEPP is connected to the hSEPP through an N32 interface (N32 for short). For all related descriptions, refer to a 5G system architecture in the standard 23501. Details are not described herein.

Figure 8A:
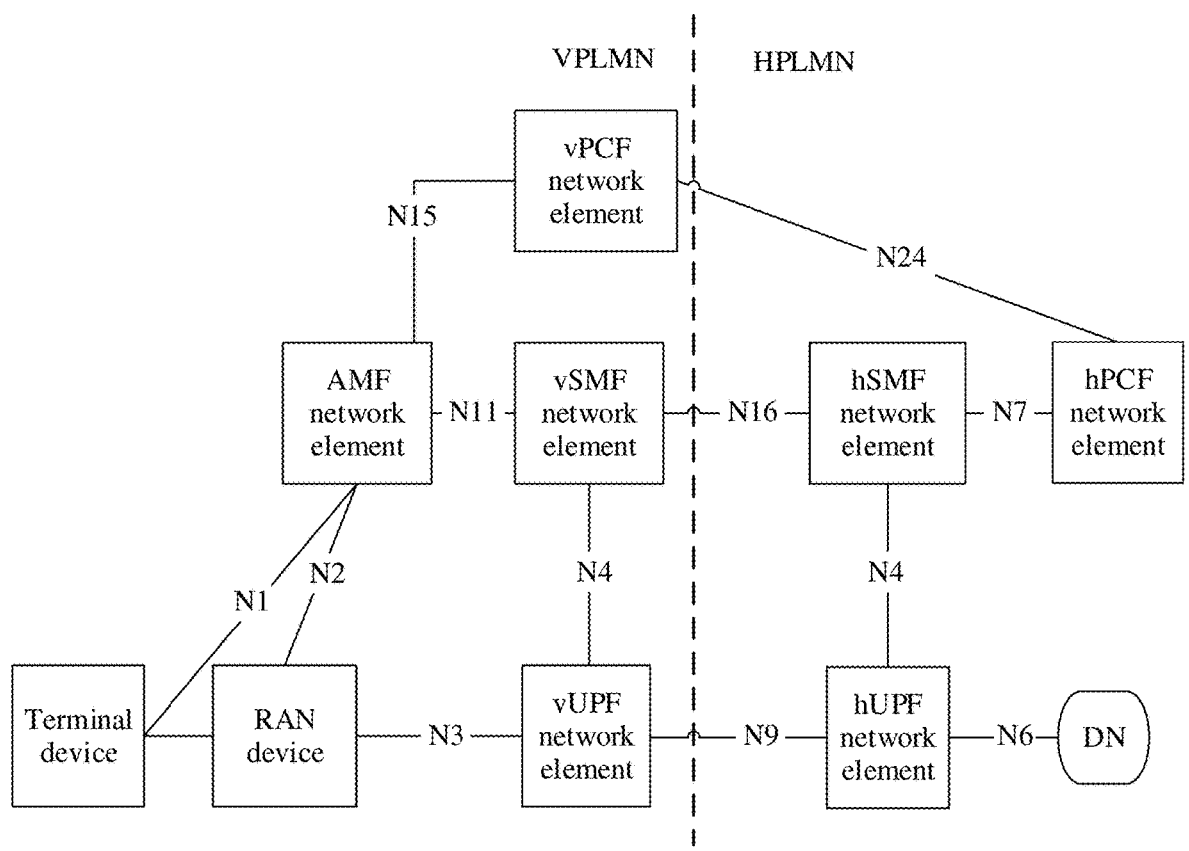
FIG. 8a shows a 5G network architecture 1 in a home routed roaming scenario according to an embodiment of this application.

Alternatively, for example, assuming that the communication system 40 shown in FIG. 4 or the communication system 50 shown in FIG. 5 is applied to a 5G network architecture in a home routed (home routed) roaming scenario, as shown in FIG. 8a, a network element or an entity that corresponds to the foregoing session management network element may be a home SMF (hSMF) network element in the home routed roaming 5G network architecture; a network element or an entity that corresponds to the foregoing policy control network element may be an hPCF network element in the home routed roaming 5G network architecture; and a network element or an entity that corresponds to the foregoing user plane network element may be a home UPF (hUPF) network element in the home routed roaming 5G network architecture.

In addition, as shown in FIG. 8a, the home routed roaming 5G network architecture may further include a RAN device, an AMF network element, a visited UPF (vUPF) network element, a visited SMF (vSMF) network element, a vPCF network element, or the like. This is not specifically limited in this embodiment of this application. The hSMF network element, the hPCF network element, or the hUPF network element belongs to an HPLMN. The RAN device, the AMF network element, the vSMF network element, the vUPF network element, or the vPCF network element belongs to a VPLMN.

A terminal device communicates with the AMF network element through an N1 interface (N1 for short). The RAN device communicates with the AMF network element through an N2 interface (N2 for short). The RAN device communicates with the vUPF network element through an N3 interface (N3 for short). The vUPF network element communicates with the hUPF network element through an N9 interface (N9 for short). The hUPF network element communicates with a DN through an N6 interface (N6 for short). The AMF network element communicates with the vSMF network element through an N11 interface (N11 for short). The vSMF network element communicates with the hSMF network element through an N16 interface (N16 for short). The AMF network element communicates with the vPCF network element through an N15 interface (N15 for short). The vPCF network element communicates with the hPCF network element through an N24 interface (N24 for short). The vSMF network element communicates with the vUPF network element through an N4 interface (N4 for short). The hSMF network element communicates with the hUPF network element through the N4 interface (N4 for short). The hSMF network element communicates with the hPCF network element through an N7 interface (N7 for short).

Figure 8B:
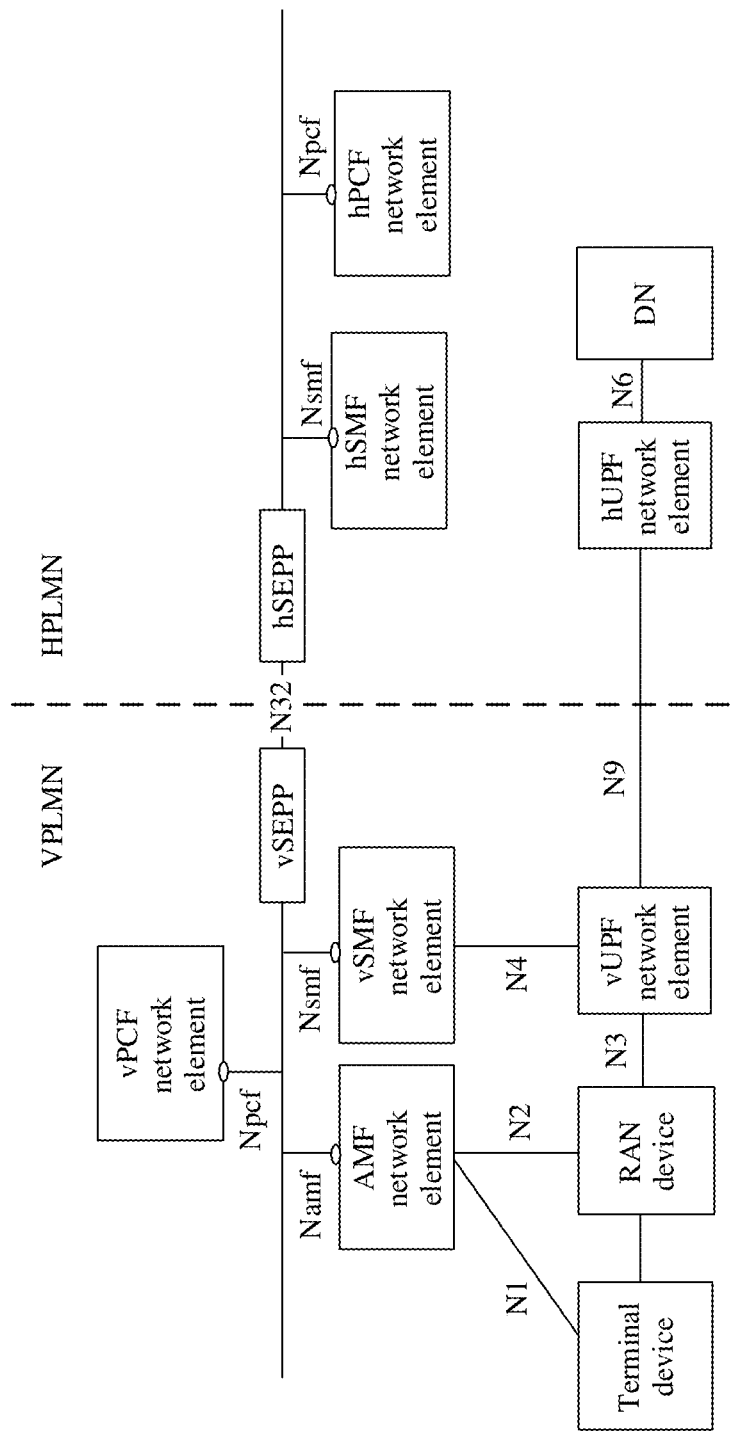
FIG. 8b shows a 5G network architecture 2 in a home routed roaming scenario according to an embodiment of this application.

In addition, it should be noted that control plane network elements such as the AMF network element, the vSMF network element, the hSMF network element, the vPCF network element, and the hPCF network element in the home routed roaming 5G network architecture shown in FIG. 8a may alternatively interact with each other through a service-based interface. For example, as shown in FIG. 8b, an external service-based interface provided by the AMF network element may be an Namf; an external service-based interface provided by the vSMF network element may be an Nsmf; an external service-based interface provided by the hSMF network element may be the Nsmf; an external service-based interface provided by the vPCF network element may be an Npcf; and an external service-based interface provided by the hPCF network element may be the Npcf. In addition, a vSEPP in FIG. 8b is configured to perform information filtering, policy control, topology hiding, and the like on a control plane interface in the VPLMN. An hSEPP in FIG. 8b is configured to perform information filtering, policy control, topology hiding, and the like on a control plane interface in the HPLMN. The vSEPP is connected to the hSEPP through an N32 interface (N32 for short). For all related descriptions, refer to a 5G system architecture in the standard 23501. Details are not described herein.

Optionally, the terminal device in embodiments of this application may be a device configured to implement a wireless communication function, for example, a terminal or a chip that may be used in the terminal. The terminal may be user equipment (UE), an access terminal, a terminal unit, a terminal station, a mobile station, a remote station, a remote terminal, a mobile device, a wireless communication device, a terminal agent, a terminal apparatus, or the like in a 5G network or a future evolved PLMN. The access terminal may be a cellular phone, a cordless phone, a session initiation protocol (session initiation protocol, SIP) phone, a wireless local loop (WLL) station, a personal digital assistant (PDA), a handheld device having a wireless communication function, a computing device, another processing device connected to a wireless modem, a vehicle-mounted device, a wearable device, a virtual reality (VR) terminal device, an augmented reality (AR) terminal device, a wireless terminal in industrial control, a wireless terminal in self driving (self driving), a wireless terminal in telemedicine, a wireless terminal in a smart grid (smart grid), a wireless terminal in transportation safety, a wireless terminal in a smart city, a wireless terminal in a smart home, or the like. The terminal may be mobile or at a fixed location.

Optionally, the RAN device in embodiments of this application is a device that accesses a core network. For example, the RAN device may be a base station, a broadband network gateway (BNG), an aggregation switch, a non-3rd generation partnership project (3GPP) access device, or the like. There may be various forms of base stations, for example, a macro base station, a micro base station (which is also referred to as a small cell), a relay station, and an access point.

Optionally, the session management network element, the policy control network element, or the user plane network element in embodiments of this application may also be referred to as a communication apparatus, and may be a general-purpose device or a special-purpose device. This is not specifically limited in embodiments of this application.

Optionally, a related function of the session management network element, the policy control network element, or the user plane network element in embodiments of this application may be implemented by one device, may be jointly implemented by a plurality of devices, or may be implemented by one or more function modules in one device. This is not specifically limited in embodiments of this application. It may be understood that the foregoing function may be a network element in a hardware device, a software function running on dedicated hardware, a combination of hardware and software, or a virtualization function instantiated on a platform (for example, a cloud platform).

Figure 9:
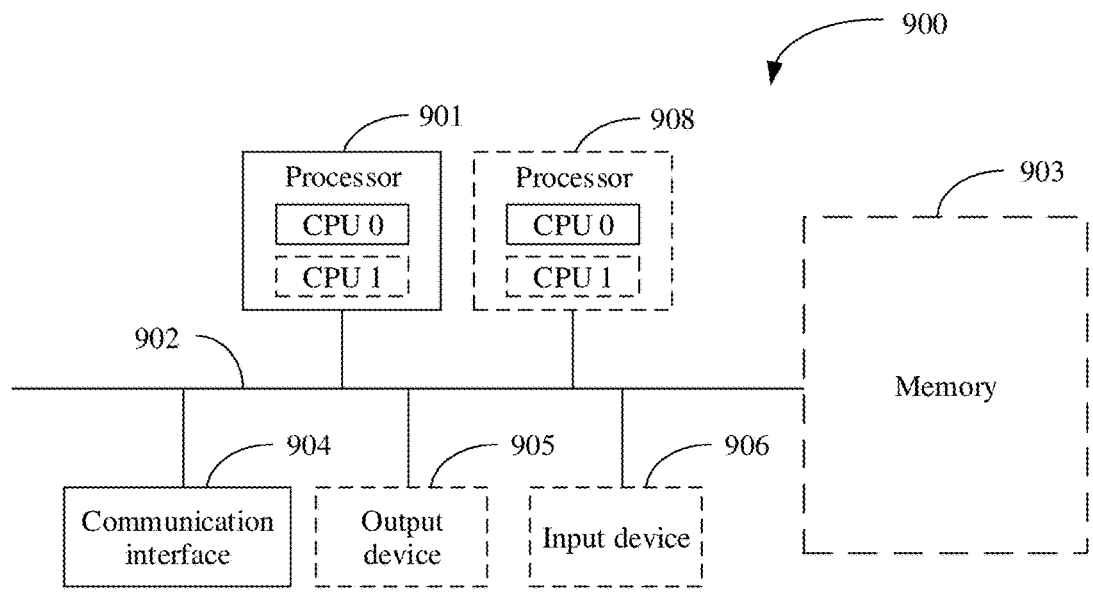
FIG. 9 is a schematic diagram of a structure of a communication device according to an embodiment of this application.

For example, the related function of the session management network element, the policy control network element, or the user plane network element in embodiments of this application may be implemented by a communication device 900 in FIG. 9. FIG. 9 is a schematic diagram of a structure of the communication device 900 according to an embodiment of this application. The communication device 900 includes one or more processors 901, a communication line 902, and at least one communication interface (in FIG. 9, that the communication device 900 includes a communication interface 904 and one processor 901 is merely an example for description). Optionally, the communication device 900 may further include a memory 903.

The processor 901 may be a general-purpose central processing unit (CPU), a microprocessor, an application-specific integrated circuit (ASIC), or one or more integrated circuits configured to control program execution of the solutions in this application.

The communication line 902 may include a path used to connect different components.

The communication interface 904 may be a transceiver module configured to communicate with another device or a communication network such as the Ethernet, a RAN, or a wireless local area network (WLAN). For example, the transceiver module may be an apparatus such as a transceiver. Optionally, the communication interface 904 may alternatively be a transceiver circuit located inside the processor 901, and is configured to implement signal input and signal output of the processor.

The memory 903 may be an apparatus having a storage function. The memory 903 may be a read-only memory (ROM), a static storage device in another type that can store static information and instructions, a random access memory (RAM), or a dynamic storage device in another type that can store information and instructions; or may be an electrically erasable programmable read-only memory (EEPROM), a compact disc read-only memory (CD-ROM), or another compact disc storage or optical disc storage (including a compact disc, a laser disc, an optical disc, a digital versatile disc, a Blu-ray disc, and the like), a magnetic disk storage medium, another magnetic storage device, or any other medium that can be used to carry or store expected program code in a form of an instruction or a data structure and that is accessible to a computer. However, the memory 903 is not limited thereto. The memory may exist independently, and is connected to the processor by using the communication line 902. The memory may alternatively be integrated with the processor.

The memory 903 is configured to store computer-executable instructions for performing the solutions in this application, and the computer-executable instructions are executed under control of the processor 901. The processor 901 is configured to execute the computer-executable instructions stored in the memory 903, to implement an uplink PDR generation method provided in embodiments of this application.

Alternatively, optionally, in embodiments of this application, the processor 901 may perform processing-related functions in the uplink PDR generation method provided in the following embodiments of this application, and the communication interface 904 is responsible for communication with another device or a communication network. This is not specifically limited in embodiments of this application.

Optionally, the computer-executable instructions in this embodiment of this application may also be referred to as application program code. This is not specifically limited in this embodiment of this application.

In specific implementation, in an embodiment, the processor 901 may include one or more CPUs, for example, a CPU 0 and a CPU 1 in FIG. 9.

In specific implementation, in an embodiment, the communication device 900 may include a plurality of processors, for example, the processor 901 and a processor 908 in FIG. 9. Each of these processors may be a single-core processor or a multi-core processor. The processor herein may include but is not limited to at least one of the following various computing devices that run software: a central processing unit (CPU), a microprocessor, a digital signal processor (DSP), a microcontroller unit (MCU), an artificial intelligence processor, or the like. Each computing device may include one or more cores configured to perform an operation or processing by executing software instructions.

In specific implementation, in an embodiment, the communication device 900 may further include an output device 905 and an input device 906. The output device 905 communicates with the processor 901 and may display information in various manners. For example, the output device 905 may be a liquid crystal display (LCD), a light emitting diode (LED) display device, a cathode ray tube (CRT) display device, a projector (projector), or the like. The input device 906 communicates with the processor 901 and may receive input of a user in a plurality of manners. For example, the input device 906 may be a mouse, a keyboard, a touchscreen device, or a sensor device.

The communication device 900 sometimes may also be referred to as a communication apparatus, and may be a general-purpose device or a special-purpose device. For example, the communication device 900 may be a desktop computer, a portable computer, a network server, a palmtop computer (PDA), a mobile phone, a tablet computer, a wireless terminal device, an embedded device, the foregoing terminal device, the foregoing network device, or a device having a structure similar to the structure shown in FIG. 9. A type of the communication device 900 is not limited in this embodiment of this application.

The session management information reporting method provided in embodiments of this application is described below in detail with reference to FIG. 1 to FIG. 9.

It should be noted that names of messages between network elements, names of parameters in the messages, or the like in the following embodiments of this application are merely examples, and there may be other names in specific implementation. This is not specifically limited in embodiments of this application.

Figure 10:
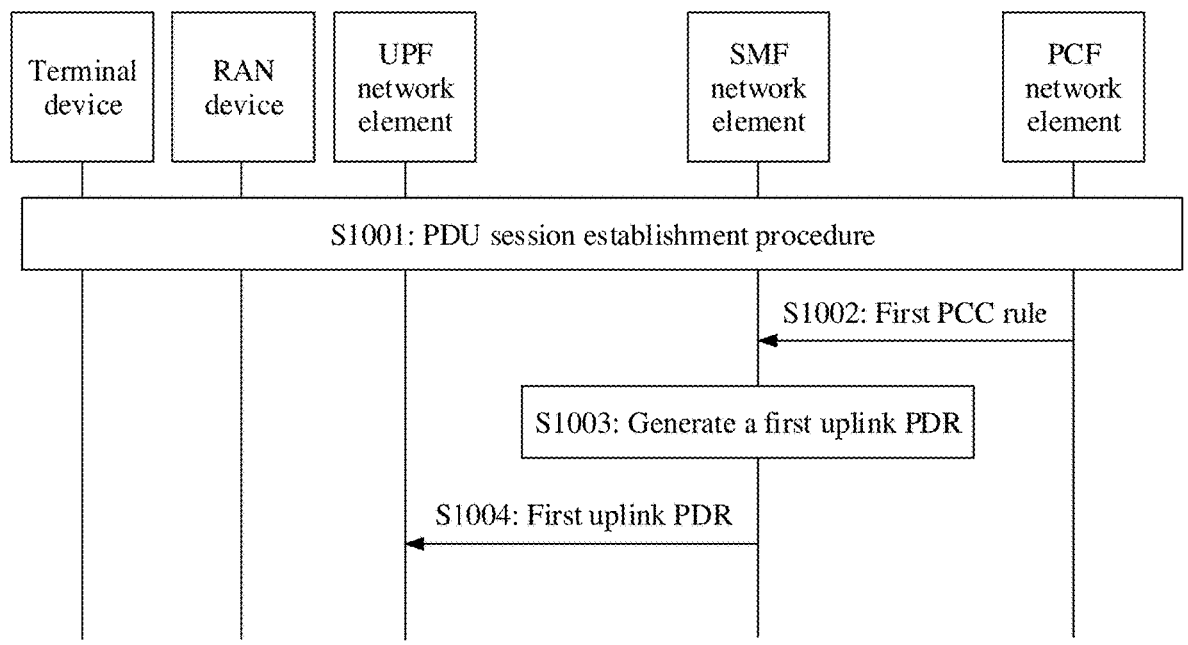
FIG. 10 is a schematic flowchart 1 of an uplink PDR generation method according to an embodiment of this application.

First, an example in which the communication system shown in FIG. 4 is applied to the 5G network architecture in the non-roaming scenario shown in FIG. 6a or FIG. 6b is used. FIG. 10 shows an uplink PDR generation method according to an embodiment of this application. The uplink PDR generation method includes the following steps.

S1001: A terminal device triggers an establishment procedure of a PDU session. For related implementation, refer to the conventional technology. Details are not described herein.

S1002: A PCF network element sends a first PCC rule to an SMF network element after the PDU session is established. Correspondingly, the SMF network element receives the first PCC rule from the PCF network element. The first PCC rule includes an RQC indication and downlink SDF information that correspond to a first service.

It should be noted that, in this embodiment of this application, a PCC rule including an RQC indication is a PCC rule including only downlink SDF information. In other words, the first PCC rule herein may be understood as a PCC rule that does not include uplink SDF information. If a PCC rule includes both uplink SDF information and downlink SDF information, the technical problem mentioned in the background does not exist, and therefore this is not discussed in embodiments of this application. Descriptions are centrally provided herein and details are not described again in the following.

S1003: If determining that the first PCC rule includes the RQC indication, the SMF network element generates, according to the first PCC rule, a first uplink PDR that corresponds to the first service.

A rule ID and a priority in the first uplink PDR are autonomously allocated. This is not specifically limited in this embodiment of this application.

Optionally, the first uplink PDR in this embodiment of this application includes a first packet filter set and a first QFI. Source information in the first packet filter set in the first uplink PDR is the same as destination information in the downlink SDF information in the first PCC rule, and destination information in the first packet filter set in the first uplink PDR is the same as source information in the downlink SDF information in the first PCC rule. QoS attribute information (such as a 5QI or an ARP, where reference can be made to the background) that corresponds to the first QFI in the first uplink PDR is the same as QoS attribute information in the first PCC rule. Descriptions are centrally provided herein and details are not described again in the following.

Certainly, in this embodiment of this application, the SMF network element may further generate, according to the first PCC rule, a downlink PDR that corresponds to the first service, and then send the downlink PDR that corresponds to the first service to a UPF network element. For a specific implementation, refer to the conventional technology. This is not specifically limited in this embodiment of this application. Although not shown in the figure, the SMF network element may further generate a QoS profile and a QoS rule according to the first PCC rule, and then send the QoS profile to a RAN device and send the QoS rule to the terminal device. For details, refer to an existing implementation. Details are not described herein.

Optionally, the downlink PDR in this embodiment of this application includes a second packet filter set and a second QFI. Considering that source information in the first packet filter set in the downlink PDR is the same as source information in the downlink SDF information in the first PCC rule, and the destination information in the first packet filter set in the first uplink PDR is the same as the destination information in the downlink SDF information in the first PCC rule, it may be understood that the source information in the first packet filter set in the first uplink PDR is the same as destination information in the second packet filter set in the downlink PDR, and the destination information in the first packet filter set is the same as source information in the second packet filter set. In addition, considering that QoS attribute information (such as a 5QI or an ARP, where reference can be made to the background) that corresponds to the second QFI in the downlink PDR is the same as the QoS attribute information in the first PCC rule, it may be understood that the first QFI is the same as the second QFI. Descriptions are centrally provided herein and details are not described again in the following.

For example, source information in this embodiment of this application may be, for example, a source IP address, a source IPv6 prefix, a source port number, or a source MAC address, and corresponding destination information may be a destination IP address, a destination IPv6 prefix, a destination port number, a destination MAC address, or the like. Descriptions are centrally provided herein and details are not described again in the following.

In addition, for a relationship between packet detection information other than the first packet filter set and the first QFI in the first uplink PDR and packet detection information other than the second packet filter set and the second QFI in the downlink PDR that corresponds to the first service, refer to features of parameters in an uplink PDR and a corresponding downlink PDR in an existing reflective QoS control mechanism. Details are not described herein.

Optionally, in this embodiment of this application, when determining that the first PCC rule includes the RQC indication, the SMF network element may first generate, according to the first PCC rule, the downlink PDR that corresponds to the first service, and then generate, according to the downlink PDR that corresponds to the first service, the first uplink PDR that corresponds to the first service. This is not specifically limited in this embodiment of this application.

S1004: The SMF network element sends, to the UPF network element, the first uplink PDR that corresponds to the first service. Correspondingly, the UPF network element receives the first uplink PDR that corresponds to the first service from the SMF network element.

Optionally, in this embodiment of this application, the SMF network element may send the first uplink PDR on the following occasions.

In a possible implementation, the uplink PDR generation method provided in this embodiment of this application further includes: The SMF network element sends, to the UPF network element, a first usage reporting rule (URR) that corresponds to the downlink PDR, where the first URR is used to trigger the UPF network element to report a first event, and the first event is that a downlink data packet of the first service is detected according to the downlink PDR. Correspondingly, that the SMF network element sends, to the UPF network element, the first uplink PDR that corresponds to the first service includes: When the SMF network element receives the first event reported by the UPF network element, the SMF network element sends, to the UPF network element, the first uplink PDR that corresponds to the first service.

Optionally, in this implementation, the SMF network element may further send a second URR that corresponds to the downlink PDR to the UPF network element, where the second URR is used to trigger the UPF network element to report a third event, and the third event is that no uplink data packet of the first service is detected according to the first uplink PDR. In this case, when the SMF network element receives the third event reported by the UPF network element, the SMF network element further notifies the UPF network element to delete the first uplink PDR.

Optionally, the first URR and the second URR in this embodiment of this application may be a same URR, or may be different URRs. In other words, in this embodiment of this application, one URR may be used to trigger the UPF network element to report both the first event and the third event, or different URRs may be respectively used to trigger the UPF network element to report the first event and the third event. This is not specifically limited in this embodiment of this application.

In another possible implementation, the uplink PDR generation method provided in this embodiment of this application further includes: The SMF network element sends, to the UPF network element, a third URR that corresponds to a second uplink PDR, where the third URR is used to trigger the UPF network element to report a second event, the second event is that an uplink data packet of the first service is detected according to the second uplink PDR, and the second uplink PDR is an uplink PDR that corresponds to the first service and that includes the first packet filter set. Correspondingly, that the SMF network element sends, to the UPF network element, the first uplink PDR that corresponds to the first service includes: When the SMF network element receives the second event reported by the UPF network element, the SMF network element sends, to the UPF network element, the first uplink PDR that corresponds to the first service.

Optionally, in this implementation, the SMF network element may further send a fourth URR that corresponds to the second uplink PDR to the UPF network element, where the fourth URR is used to trigger the user plane network element to report a third event, and the third event is that no uplink data packet of the first service is detected according to the first uplink PDR. In this case, when the SMF network element receives the third event reported by the UPF network element, the SMF network element further notifies the UPF network element to delete the first uplink PDR.

Optionally, the third URR and the fourth URR in this embodiment of this application may be a same URR, or may be different URRs. In other words, in this embodiment of this application, one URR may be used to trigger the UPF network element to report both the second event and the third event, or different URRs may be respectively used to trigger the UPF network element to report the second event and the third event. This is not specifically limited in this embodiment of this application.

According to the uplink PDR generation method provided in this embodiment of this application, the UPF network element can obtain the first uplink PDR that corresponds to the first service, so that the following problem is avoided: The UPF network element may not be capable of mapping an uplink data packet of a corresponding service to a correct QoS flow for transmission after receiving the uplink data packet because there is no uplink PDR, and consequently the data packet may be discarded.

Actions of the SMF network element in the foregoing steps S1001 to S1004 may be performed by the processor 901 in the communication device 900 shown in FIG. 9 by invoking the application program code stored in the memory 903. This is not limited in this embodiment of this application.

Figure 11:
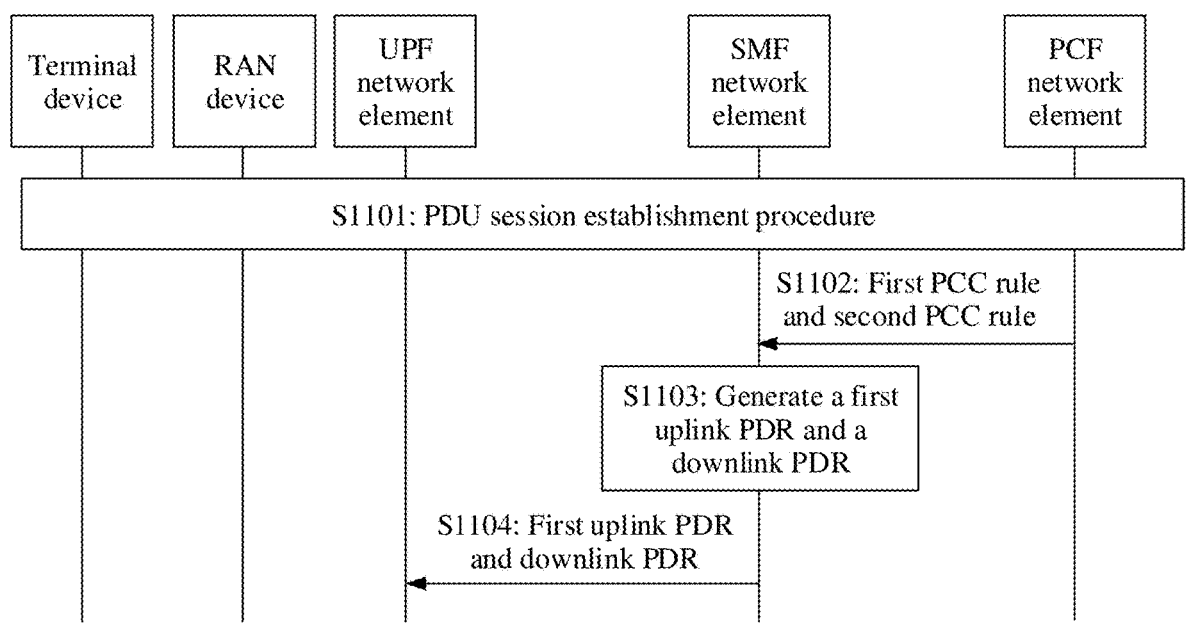
FIG. 11 is a schematic flowchart 2 of an uplink PDR generation method according to an embodiment of this application.

Optionally, an example in which the communication system shown in FIG. 4 is applied to the 5G network architecture in the non-roaming scenario shown in FIG. 6*a* or FIG. 6*b* is used. FIG. 11 shows another uplink PDR generation method according to an embodiment of this application. The uplink PDR generation method includes the following steps.

S1101: A terminal device triggers an establishment procedure of a PDU session. For related implementation, refer to the conventional technology. Details are not described herein.

S1102: A PCF network element sends a first PCC rule and a second PCC rule to an SMF network element after the PDU session is established. Correspondingly, the SMF network element receives the first PCC rule and the second PCC rule from the PCF network element.

The first PCC rule includes an RQC indication and downlink SDF information that correspond to a first service. The second PCC rule includes an uplink indication, where the uplink indication is used to indicate to generate an uplink PDR. Optionally, the uplink indication may further indicate to skip generating a QoS profile and a QoS rule. This is not specifically limited in this embodiment of this application.

In a possible implementation, the uplink indication may be uplink SDF information that corresponds to the first service included in the second PCC rule, where source information in the uplink SDF information is the same as destination information in the downlink SDF information that corresponds to the first service, and destination information in the uplink SDF information is the same as source information in the downlink SDF information. For related descriptions of the source information and the destination information, refer to the embodiment shown in FIG. 10. Details are not described herein again.

In another possible implementation, the uplink indication may be an RQC indication included in a second uplink PCC rule.

S1103: The SMF network element generates, according to the first PCC rule, a downlink PDR that corresponds to the first service; and in response to the uplink indication, the SMF network element generates, according to the second PCC rule, a first uplink PDR that corresponds to the first service, and skips generating the QoS profile and the QoS rule.

For a manner in which the SMF network element generates, according to the first PCC rule, the downlink PDR that corresponds to the first service, refer to the conventional technology. Details are not described herein. Although not shown in the figure, the SMF network element may further generate the QoS profile and the QoS rule according to the first PCC rule, and then send the QoS profile to a RAN device and send the QoS rule to the terminal device. For details, refer to an existing implementation. Details are not described herein.

Optionally, the first uplink PDR in this embodiment of this application includes a first packet filter set and a first QFI, where the first QFI is the same as a second QFI in the downlink PDR that corresponds to the first service, source information in the first packet filter set is the same as destination information in a second packet filter set in the downlink PDR, and destination information in the first packet filter set is the same as source information in the second packet filter set. For related descriptions of the source information and the destination information, refer to the embodiment shown in FIG. 10. Details are not described herein again.

S1104: The SMF network element sends, to the UPF network element, the first uplink PDR and the downlink PDR that correspond to the first service. Correspondingly, the UPF network element receives the first uplink PDR and the downlink PDR that correspond to the first service from the SMF network element.

According to the uplink PDR generation method provided in this embodiment of this application, the UPF network element can obtain the first uplink PDR that corresponds to the first service, so that the following problem is avoided: The UPF network element may not be capable of mapping an uplink data packet of a corresponding service to a correct QoS flow for transmission after receiving the uplink data packet because there is no uplink PDR, and consequently the data packet may be discarded.

Actions of the SMF network element in the foregoing steps S1101 to S1104 may be performed by the processor 901 in the communication device 900 shown in FIG. 9 by invoking the application program code stored in the memory 903. This is not limited in this embodiment of this application.

Figure 12:
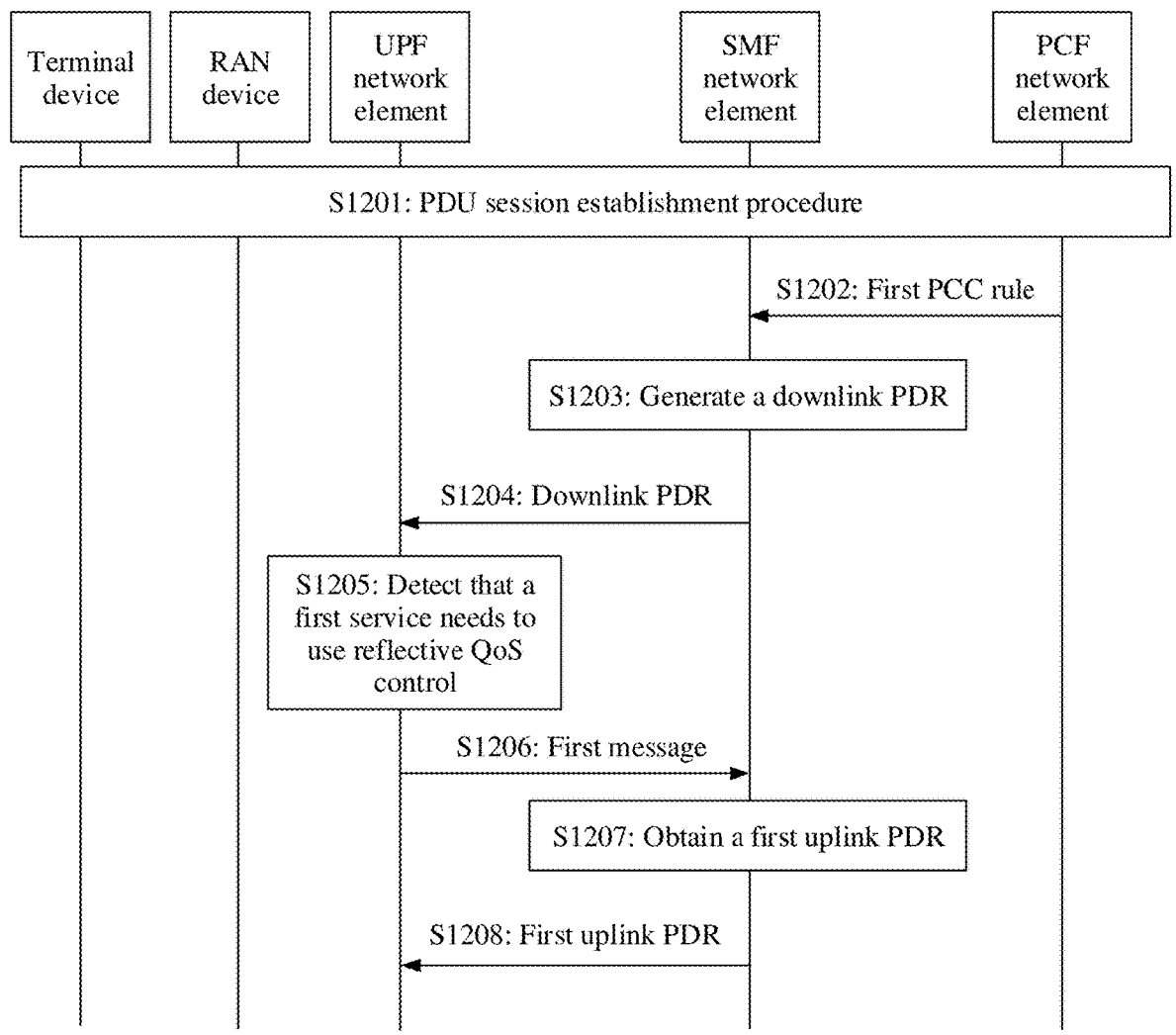
FIG. 12 is a schematic flowchart 3 of an uplink PDR generation method according to an embodiment of this application.

Optionally, an example in which the communication system shown in FIG. 5 is applied to the 5G network architecture in the non-roaming scenario shown in FIG. 6*a* or FIG. 6*b* is used. FIG. 12 shows still another uplink PDR generation method according to an embodiment of this application. The uplink PDR generation method includes the following steps.

S1201: A terminal device triggers an establishment procedure of a PDU session. For related implementation, refer to the conventional technology. Details are not described herein.

S1202: A PCF network element sends a first PCC rule to an SMF network element after the PDU session is established. Correspondingly, the SMF network element receives the first PCC rule from the PCF network element. The first PCC rule includes an RQC indication and downlink SDF information that correspond to a first service.

It should be noted that, in this embodiment of this application, a PCC rule including an RQC indication is a PCC rule including only downlink SDF information. In other words, the first PCC rule herein may be understood as a PCC rule that does not include uplink SDF information.

If a PCC rule includes both uplink SDF information and downlink SDF information, the technical problem mentioned in the background does not exist, and therefore this is not discussed in embodiments of this application. Descriptions are centrally provided herein and details are not described again in the following.

S1203: The SMF network element generates, according to the first PCC rule, a downlink PDR that corresponds to the first service.

S1204: The SMF network element sends, to a UPF network element, the downlink PDR that corresponds to the first service. Correspondingly, the UPF network element receives the downlink PDR that corresponds to the first service from the SMF network element.

For related implementation of steps S1202 to S1204, refer to the conventional technology. Details are not described herein.

Optionally, in this embodiment of this application, an N4 rule such as the downlink PDR, a URR that corresponds to the downlink PDR, or a QoS enforcement rule (QER) that corresponds to the downlink PDR may include indication information, where the indication information is used to indicate to report an event in which there is no uplink PDR. For example, the indication information may be a trigger for reporting the event in which there is no uplink PDR.

Further, the uplink PDR generation method provided in this embodiment of this application may further include the following steps.

S1205: The UPF network element detects that the first service needs to use reflective QoS control.

S1206: When there is no first uplink PDR that corresponds to the first service, the UPF network element sends a first message to the SMF network element. Correspondingly, the SMF network element receives the first message from the UPF network element.

The first message is used to trigger the SMF network element to send the first uplink PDR that corresponds to the first service.

Optionally, in this embodiment of this application, when obtaining the indication information, or in response to the indication information and when there is no first uplink PDR that corresponds to the first service, the UPF network element may send the first message to the SMF network element. This is not specifically limited in this embodiment of this application.

S1207: The SMF network element obtains the first uplink PDR that corresponds to the first service.

In a possible implementation, the SMF network element may generate, based on the manner of the embodiment shown in FIG. 10, the first uplink PDR that corresponds to the first service.

It should be noted that, it is different from the embodiment shown in FIG. 10 that, the SMF network element in this embodiment of this application may not be capable of determining, based on the RQC indication in the first PCC rule, that the first service needs to use the reflective QoS control, but may determine, only when receiving the first message from the UPF network element, that the first service needs to use the reflective QoS control, and then generate, based on the first PCC rule or the downlink PDR that corresponds to the first service, the first uplink PDR that corresponds to the first service. Descriptions are centrally provided herein and details are not described again in the following.

In another possible implementation, in response to the first message, the SMF network element may send a second message to the PCF network element, where the second message is used to notify the PCF network element that the UPF network element does not have the first uplink PDR that corresponds to the first service. Further, after receiving the second message, the PCF network element may send a second PCC rule including an uplink indication to the SMF network element. After receiving the second PCC rule, in response to the uplink indication, the SMF network element generates an uplink PDR based on the second PCC rule and skips generating a QoS profile and a QoS rule. For related implementation, refer to the embodiment shown in FIG. 11. Details are not described herein again.

S1208: The SMF network element sends, to the UPF network element, the first uplink PDR that corresponds to the first service. Correspondingly, the UPF network element receives the first uplink PDR that corresponds to the first service from the SMF network element.

Optionally, in this embodiment of this application, after detecting that the first service needs to use the reflective QoS control, when there is no first uplink PDR that corresponds to the first service, the UPF network element may alternatively generate the first uplink PDR that corresponds to the first service. This is not specifically limited in this embodiment of this application.

According to the uplink PDR generation method provided in this embodiment of this application, the UPF network element can obtain the first uplink PDR that corresponds to the first service, so that the following problem is avoided: The UPF network element may not be capable of mapping an uplink data packet of a corresponding service to a correct QoS flow for transmission after receiving the uplink data packet because there is no uplink PDR, and consequently the data packet may be discarded.

Actions of the SMF network element or the UPF network element in the foregoing steps S1201 to S1208 may be performed by the processor 901 in the communication device 900 shown in FIG. 9 by invoking the application program code stored in the memory 903. This is not limited in this embodiment of this application.

Figure 13:
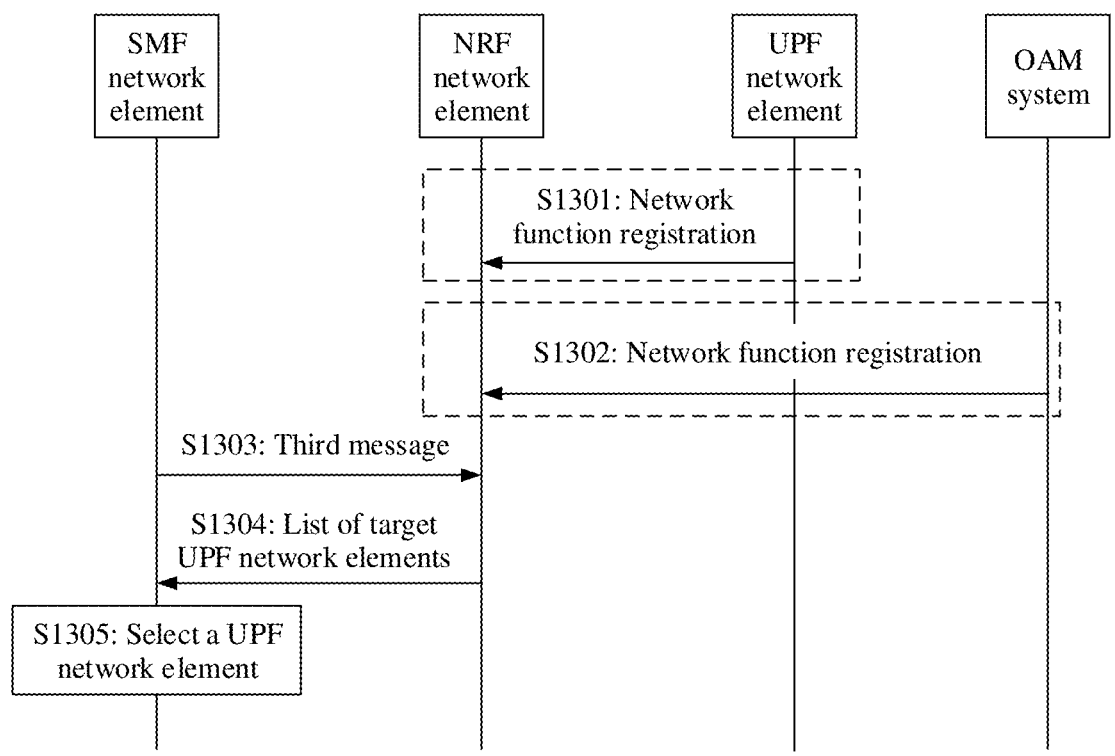
FIG. 13 is a schematic flowchart 4 of an uplink PDR generation method according to an embodiment of this application.

Optionally, an example in which the communication system shown in FIG. 5 is applied to the 5G network architecture in the non-roaming scenario shown in FIG. 6*a* or FIG. 6*b* is used. To select a UPF network element that has a capability of detecting that a service needs to use reflective QoS control, as shown in FIG. 13, an uplink PDR generation method provided in an embodiment of this application further includes the following step S1301 or the following step S1302.

S1301: An operator deploys a new UPF network element, and the UPF network element performs network function registration with an NRF network element. In a network function registration process, the UPF network element reports, to the NRF network element, uplink PDR generation capability information of the UPF network element in a reflective QoS control mechanism. The generation capability information represents whether the UPF network element has the capability of detecting that the service needs to use the reflective QoS control. Alternatively, the generation capability information represents whether the UPF network element has a capability of reporting to an SMF network element to enable the SMF network element to generate an uplink PDR. Alternatively, the generation capability information may represent whether the UPF network element can generate the uplink PDR. This is not specifically limited in this embodiment of this application.

S1302: An operator deploys a new UPF network element, and an operation administration and maintenance system performs network function registration with an NRF network element. In a network function registration process, the OAM system reports, to the NRF network element, uplink PDR generation capability information of the UPF network element in a reflective QoS control mechanism. The generation capability information represents whether the UPF network element has the capability of detecting that the service needs to use the reflective QoS control. Alternatively, the generation capability information represents whether the UPF network element has a capability of reporting to an SMF network element to enable the SMF network element to generate the uplink PDR. Alternatively, the generation capability information may further represent whether the UPF network element can generate the uplink PDR. This is not specifically limited in this embodiment of this application.

Further, the uplink PDR generation method provided in this embodiment of this application may further include the following steps.

S1303: The SMF network element sends a third message to the NRF network element. Correspondingly, the NRF network element receives the third message from the SMF network element.

The third message includes uplink PDR generation capability information of a target UPF network element in the reflective QoS control mechanism. The generation capability information represents that the target UPF network element has the capability of detecting that the service needs to use the reflective QoS control. Alternatively, the generation capability information represents that the UPF network element (for example, the UPF network element in the embodiment shown in FIG. 12) has the capability of reporting to the SMF network element to enable the SMF network element to generate the uplink PDR. Alternatively, the generation capability information may further represent that the target UPF network element can generate the uplink PDR. This is not specifically limited in this embodiment of this application.

S1304: The NRF network element sends a list of target UPF network elements to the SMF network element. Correspondingly, the SMF network element receives the list of target UPF network elements from the NRF network element.

The list of target UPF network elements includes one or more target UPF network elements that meet a requirement.

S1305: The SMF network element selects, from the list of target UPF network elements, a UPF network element that serves a session in which a first service is located.

Based on this solution, a UPF network element that has the capability of detecting that the service needs to use the reflective QoS control can be selected for the session in which the first service is located.

Actions of the SMF network element in the foregoing steps S1301 to S1305 may be performed by the processor 901 in the communication device 900 shown in FIG. 9 by invoking the application program code stored in the memory 903. This is not limited in this embodiment of this application.

It should be noted that the embodiments shown in FIG. 10 to FIG. 13 are described by using an example in which the communication system shown in FIG. 4 or FIG. 5 is applied to the 5G network architecture in the non-roaming scenario shown in FIG. 6a or FIG. 6b. If descriptions are provided by using an example in which the communication system shown in FIG. 4 or FIG. 5 is applied to the local breakout roaming 5G network architecture shown in FIG. 7a or FIG. 7b or an example in which the communication system shown in FIG. 4 or FIG. 5 is applied to the home routed roaming 5G network architecture shown in FIG. 8a or FIG. 8b, a corresponding uplink PDR generation method is similar to the methods in the foregoing embodiments, and only a related network element needs to be adaptively replaced. Details are not described herein again.

It may be understood that in the foregoing embodiments, methods and/or steps implemented by the session management network element may also be implemented by a component (for example, a chip or a circuit) that can be used in the session management network element, and methods and/or steps implemented by the user plane network element may also be implemented by a component (for example, a chip or a circuit) that can be used in the user plane network element.

The foregoing mainly describes the solutions provided in embodiments of this application from a perspective of interaction between network elements. Correspondingly, an embodiment of this application further provides a communication apparatus. The communication apparatus may be the session management network element in the foregoing method embodiments, an apparatus including the session management network element, or a component that can be used in the session management network element. Alternatively, the communication apparatus may be the user plane network element in the foregoing method embodiments, an apparatus including the user plane network element, or a component that may be used in the user plane network element. It can be understood that, to implement the foregoing functions, the communication apparatus includes a corresponding hardware structure and/or software module for performing the functions. A person skilled in the art should be easily aware that, with reference to units and algorithm steps in the examples described in embodiments disclosed in this specification, this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 14:
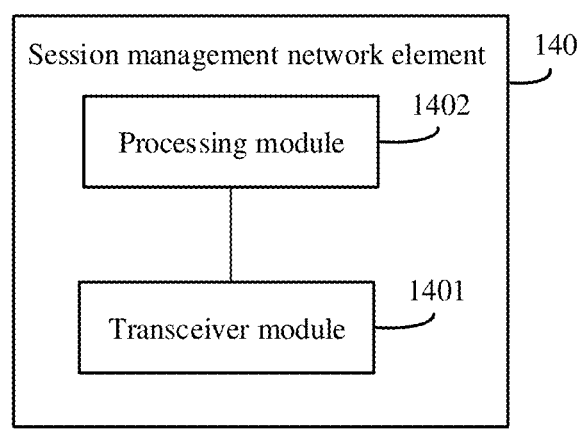
FIG. 14 is a schematic diagram of a structure of a session management network element according to an embodiment of this application.

For example, the communication apparatus is the session management network element in the foregoing method embodiments. FIG. 14 is a schematic diagram of a structure of a session management network element 140. The session management network element 140 includes a transceiver module 1401 and a processing module 1402. The transceiver module 1401 may also be referred to as a transceiver unit, and is configured to implement sending and receiving functions. For example, the transceiver module 1401 may be a transceiver circuit, a transceiver, or a communication interface.

In a possible implementation, the transceiver module 1401 is configured to receive a first PCC rule from a policy control network element, where the first PCC rule includes downlink SDF information that corresponds to a first service. The processing module 1402 is configured to: when the first PCC rule includes an RQC indication, generate, according to the first PCC rule, a first uplink PDR that corresponds to the first service. The transceiver module 1401 is further configured to send, to a user plane network element, the first uplink PDR that corresponds to the first service.

Optionally, the transceiver module 1401 is further configured to send, to the user plane network element, a first URR that corresponds to a downlink PDR that corresponds to the first service, where the first URR is used to trigger the user plane network element to report a first event, and the first event is that a downlink data packet of the first service is detected according to the downlink PDR. That the transceiver module 1401 is configured to send, to a user plane network element, the first uplink PDR that corresponds to the first service includes: when receiving the first event reported by the user plane network element, sending, to the user plane network element, the first uplink PDR that corresponds to the first service.

Optionally, the transceiver module 1401 is further configured to send, to the user plane network element, a second URR that corresponds to the downlink PDR that corresponds to the first service, where the second URR is used to trigger the user plane network element to report a third event, and the third event is that no uplink data packet of the first service is detected according to the first uplink PDR. The transceiver module 1401 is further configured to notify, when receiving the third event reported by the user plane network element, the user plane network element to delete the first uplink PDR.

Optionally, the transceiver module 1401 is further configured to send, to the user plane network element, a third URR that corresponds to a second uplink PDR, where the third URR is used to trigger the user plane network element to report a second event, the second event is that an uplink data packet of the first service is detected according to the second uplink PDR, and the second uplink PDR is an uplink PDR that corresponds to the first service and that includes a first packet filter set. That the transceiver module 1401 is configured to send, to a user plane network element, the first uplink PDR that corresponds to the first service includes:

when receiving the second event reported by the user plane network element, sending, to the user plane network element, the first uplink PDR that corresponds to the first service.

Optionally, the transceiver module 1401 is further configured to send, to the user plane network element, a fourth URR that corresponds to the second uplink PDR, where the fourth URR is used to trigger the user plane network element to report the third event, and the third event is that no uplink data packet of the first service is detected according to the first uplink PDR. The transceiver module 1401 is further configured to notify, when receiving the third event reported by the user plane network element, the user plane network element to delete the first uplink PDR.

In another possible implementation, the transceiver module 1401 is configured to receive a second PCC rule from a policy control network element, where the second PCC rule includes an uplink indication, and the uplink indication is used to indicate to generate an uplink PDR. The processing module 1402 is configured to: in response to the uplink indication, generate, according to the second PCC rule, a first uplink PDR that corresponds to a first service, and skip generating a QoS profile and a QoS rule. The transceiver module 1401 is further configured to send, to a user plane network element, the first uplink PDR that corresponds to the first service.

Optionally, the transceiver module 1401 is further configured to receive a first PCC rule from the policy control network element, where the first PCC rule includes downlink SDF information that corresponds to the first service. The processing module 1402 is further configured to generate, according to the first PCC rule, a downlink PDR that corresponds to the first service.

In still another possible implementation, the transceiver module 1401 is configured to receive a first message from a user plane network element, where the first message is used to trigger a session management network element to send a first uplink PDR that corresponds to a first service. The processing module 1402 is configured to obtain the first uplink PDR that corresponds to the first service. The transceiver module 1401 is further configured to send, to the user plane network element, the first uplink PDR that corresponds to the first service.

Optionally, the processing module 1402 is specifically configured to generate the first uplink PDR that corresponds to the first service.

Alternatively, optionally, the processing module 1402 is specifically configured to: send a second message to a policy control network element via the transceiver module 1401, where the second message is used to notify the policy control network element that the user plane network element does not have the first uplink PDR that corresponds to the first service; receive a second policy and charging control PCC rule from the policy control network element via the transceiver module 1401, where the second PCC rule includes an uplink indication, and the uplink indication is used to indicate to generate an uplink PDR; and in response to the uplink indication, generate, according to the second PCC rule, the first uplink PDR that corresponds to the first service, and skip generating a QoS profile and a QoS rule.

Optionally, the transceiver module 1401 is further configured to send indication information to the user plane network element, where the indication information is used to indicate to report an event in which there is no uplink PDR.

Optionally, the transceiver module 1401 is further configured to send a third message to a network repository function network element, where the third message includes uplink PDR generation capability information of a target user plane network element in a reflective QoS control mechanism, and the generation capability information represents that the target user plane network element has a capability of detecting that a service needs to use reflective QoS control. The transceiver module 1401 is further configured to receive a list of target user plane network elements from the network repository function network element, where the list of target user plane network elements includes the user plane network element. The processing module 1402 is further configured to select, from the list of target user plane network elements, a user plane network element that serves a session in which the first service is located.

All related content of the steps in the method embodiments may be cited in function descriptions of corresponding function modules. Details are not described herein again.

In this embodiment, the session management network element 140 is presented in a form of function modules obtained through division in an integrated manner. The "module" herein may be a specific ASIC, a circuit, a processor executing one or more software or firmware programs, a memory, an integrated logic circuit, and/or another component that can provide the foregoing functions. In a simple embodiment, a person skilled in the art may figure out that the session management network element 140 may be in a form of the communication device 900 shown in FIG. 9.

For example, the processor 901 in the communication device 900 shown in FIG. 9 may invoke the computer-executable instructions stored in the memory 903, to enable the communication device 900 to perform the uplink PDR generation method in the foregoing method embodiments.

Specifically, functions/implementation processes of the transceiver module 1401 and the processing module 1402 in FIG. 14 may be implemented by the processor 901 in the communication device 900 shown in FIG. 9 by invoking the computer-executable instructions stored in the memory 903. Alternatively, a function/an implementation process of the processing module 1402 in FIG. 14 may be implemented by the processor 901 in the communication device 900 shown in FIG. 9 by invoking the computer-executable instructions stored in the memory 903, and a function/an implementation process of the transceiver module 1401 in FIG. 14 may be implemented through the communication interface 904 in the communication device 900 shown in FIG. 9.

The session management network element 140 provided in this embodiment may perform the foregoing uplink PDR generation method. Therefore, for a technical effect that can be achieved by the session management network element 140, refer to the foregoing method embodiments. Details are not described herein.

Figure 15:
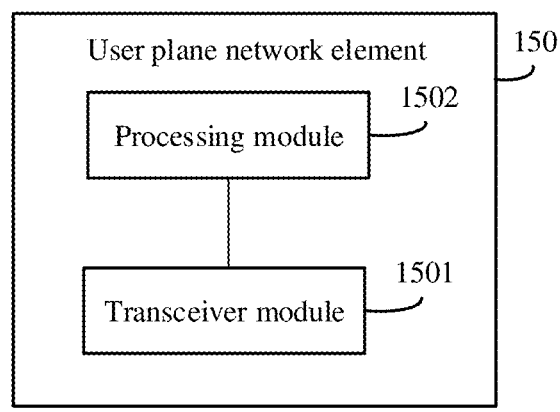
FIG. 15 is a schematic diagram of a structure of a user plane network element according to an embodiment of this application.

For example, the communication apparatus is the user plane network element in the foregoing method embodiments. FIG. 15 is a schematic diagram of a structure of a user plane network element 150. The user plane network element 150 includes a transceiver module 1501 and a processing module 1502. The transceiver module 1501 may also be referred to as a transceiver unit, and is configured to implement sending and receiving functions. For example, the transceiver module 1501 may be a transceiver circuit, a transceiver, or a communication interface.

The processing module 1502 is configured to detect that a first service needs to use reflective QoS control. The transceiver module 1501 is configured to: when there is no first uplink PDR that corresponds to the first service, send a first message to a session management network element, where the first message is used to trigger the session management network element to send the first uplink PDR that corresponds to the first service. The transceiver module 1501 is further configured to receive the first uplink PDR that corresponds to the first service from the session management network element.

Optionally, the transceiver module 1501 is further configured to receive indication information from the session management network element, where the indication information is used to indicate to report an event in which there is no uplink PDR.

All related content of the steps in the method embodiments may be cited in function descriptions of corresponding function modules. Details are not described herein again.

In this embodiment, the user plane network element 150 is presented in a form of function modules obtained through division in an integrated manner. The "module" herein may be a specific ASIC, a circuit, a processor executing one or more software or firmware programs, a memory, an integrated logic circuit, and/or another component that can provide the foregoing functions. In a simple embodiment, a person skilled in the art may figure out that the user plane network element 150 may be in a form of the communication device 900 shown in FIG. 9.

For example, the processor 901 in the communication device 900 shown in FIG. 9 may invoke the computer-executable instructions stored in the memory 903, to enable the communication device 900 to perform the uplink PDR generation method in the foregoing method embodiments.

Specifically, functions/implementation processes of the transceiver module 1501 and the processing module 1502 in FIG. 15 may be implemented by the processor 901 in the communication device 900 shown in FIG. 9 by invoking the computer-executable instructions stored in the memory 903. Alternatively, a function/an implementation process of the processing module 1502 in FIG. 15 may be implemented by the processor 901 in the communication device 900 shown in FIG. 9 by invoking the computer-executable instructions stored in the memory 903, and a function/an implementation process of the transceiver module 1501 in FIG. 15 may be implemented through the communication interface 904 in the communication device 900 shown in FIG. 9.

The user plane network element 150 provided in this embodiment may perform the foregoing uplink PDR generation method. Therefore, for a technical effect that can be achieved by the user plane network element 150, refer to the foregoing method embodiments. Details are not described herein.

It should be noted that one or more of the foregoing modules or units may be implemented by using software, hardware, or a combination thereof. When any one of the foregoing modules or units is implemented by using software, the software exists in a form of computer program instructions, and is stored in a memory. A processor may be configured to execute the program instructions to implement the foregoing method procedures. The processor may be built into a SoC (system-on-a-chip) or an ASIC, or may be an independent semiconductor chip. The processor includes a core for executing software instructions to perform operations or processing, and may further include a necessary hardware accelerator, for example, a field programmable gate array (FPGA), a PLD (programmable logic device), or a logic circuit that implements a special-purpose logic operation.

When the foregoing modules or units are implemented by using hardware, the hardware may be any one or any combination of a CPU, a microprocessor, a digital signal processing (DSP) chip, a microcontroller unit (MCU), an artificial intelligence processor, an ASIC, a SoC, an FPGA, a PLD, a dedicated digital circuit, a hardware accelerator, or a non-integrated discrete device, and the hardware may run necessary software or does not depend on software to perform the foregoing method procedures.

Optionally, an embodiment of this application further provides a communication apparatus (for example, the communication apparatus may be a chip or a chip system). The communication apparatus includes a processor, configured to implement the method according to any one of the foregoing method embodiments. In a possible implementation, the communication apparatus further includes a memory. The memory is configured to store necessary program instructions and data. The processor may invoke program code stored in the memory, to indicate the communication apparatus to perform the method according to any one of the foregoing method embodiments. Certainly, the memory may alternatively not be located in the communication apparatus. When the communication apparatus is the chip system, the communication apparatus may include a chip, or may include the chip and another discrete component. This is not specifically limited in this embodiment of this application.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of "a plurality of". A single processor or another unit may implement a plurality of functions enumerated in the claims. Some measures are recorded in dependent claims that are different from each other, but this does not mean that the measures cannot be combined to produce a good effect.

Although this application is described with reference to specific features and embodiments thereof, it is clearly that various modifications and combinations may be made to them without departing from the spirit and scope of this application. Correspondingly, the specification and accompanying drawings are merely example descriptions of this application defined by the appended claims, and are considered as any of and all modifications, variations, combinations or equivalents that cover the scope of this application. It is clearly that a person skilled in the art can make various modifications and variations to this application without departing from the spirit and scope of this application. This application is intended to cover these modifications and variations of this application provided that they fall within the scope of protection defined by the claims of this application and their equivalent technologies.

What is claimed is:

1. An uplink packet detection rule (PDR) generation method, comprising:
   receiving, by a session management network element, a first policy and charging control (PCC) rule from a policy control network element, wherein the first PCC rule comprises downlink service data flow (SDF) information that corresponds to a first service;
   in response to the first PCC rule comprising a reflective quality of service control (RQC) indication, generating, by the session management network element according to the first PCC rule, a first uplink PDR that corresponds to the first service; and
   sending, by the session management network element to a user plane network element, the first uplink PDR that corresponds to the first service.

2. The method according to claim 1, wherein
   the first uplink PDR comprises a first packet filter set and a first quality of service flow identifier (QFI), wherein the first QFI is the same as a second QFI in a downlink PDR that corresponds to the first service, source information in the first packet filter set is the same as destination information in a second packet filter set in the downlink PDR, and destination information in the first packet filter set is the same as source information in the second packet filter set.

3. The method according to claim 1, further comprising:
   sending, by the session management network element to the user plane network element, a first usage reporting rule (URR) that corresponds to a downlink PDR that corresponds to the first service, wherein the first URR triggers the user plane network element to report a first event, and the first event is that a downlink data packet of the first service is detected according to the downlink PDR,
   wherein the sending, by the session management network element to the user plane network element, the first uplink PDR that corresponds to the first service comprises:
   in response to the session management network element receiving the first event reported by the user plane network element, sending, by the session management network element to the user plane network element, the first uplink PDR that corresponds to the first service.

4. The method according to claim 3, further comprising:
   sending, by the session management network element to the user plane network element, a second URR that corresponds to the downlink PDR, wherein the second URR triggers the user plane network element to report a third event, and the third event is that no uplink data packet of the first service is detected according to the first uplink PDR received at the user plane network element from the session management network element; and
   in response to the session management network element receiving the third event reported by the user plane network element, notifying, by the session management network element, the user plane network element to delete the first uplink PDR.

5. The method according to claim 2, further comprising:
   sending, by the session management network element to the user plane network element, a third usage reporting rule (URR) that corresponds to a second uplink PDR, wherein the third URR triggers the user plane network element to report a second event, the second event is that an uplink data packet of the first service is detected according to the second uplink PDR, and the second uplink PDR is an uplink PDR that corresponds to the first service and that comprises the first packet filter set,
   wherein the sending, by the session management network element to the user plane network element, the first uplink PDR that corresponds to the first service comprises:
   in response to the session management network element receiving the second event reported by the user plane network element, sending, by the session management network element to the user plane network element, the first uplink PDR that corresponds to the first service.

6. The method according to claim 5, further comprising:
   sending, by the session management network element to the user plane network element, a fourth URR that corresponds to the second uplink PDR, wherein the fourth URR triggers the user plane network element to report a third event, and the third event is that no uplink data packet of the first service is detected according to the first uplink PDR; and
   in response to the session management network element receiving the third event reported by the user plane network element, notifying, by the session management network element, the user plane network element to delete the first uplink PDR.

7. A session management network element, comprising:
   a memory storing executable instructions; and
   a processor configured to execute the executable instructions to perform operations of:
   receiving a first policy and charging control (PCC) rule from a policy control network element, wherein the first PCC rule comprises downlink service data flow (SDF) information that corresponds to a first service;
   generating, according to the first PCC rule and in response to the first PCC rule comprising a reflective quality of service control (RQC) indication, a first uplink packet detection rule (PDR) that corresponds to the first service; and
   sending, to a user plane network element, the first uplink PDR that corresponds to the first service.

8. The session management network element according to claim 7, wherein
   the first uplink PDR comprises a first packet filter set and a first quality of service flow identifier (QFI), wherein the first QFI is the same as a second QFI in a downlink PDR that corresponds to the first service, source information in the first packet filter set is the same as destination information in a second packet filter set in the downlink PDR, and destination information in the first packet filter set is the same as source information in the second packet filter set.

9. The session management network element according to claim 7, wherein
the operations further comprise:
sending, to the user plane network element, a first usage reporting rule (URR) that corresponds to a downlink PDR that corresponds to the first service, wherein the first URR triggers the user plane network element to report a first event, and the first event is that a downlink data packet of the first service is detected according to the downlink PDR; and
the operation of sending the first uplink PDR to the user plane network element comprises:
in response to receiving the first event reported by the user plane network element, sending, to the user plane network element, the first uplink PDR that corresponds to the first service.

10. The session management network element according to claim 9, wherein
the operations further comprise:
sending, to the user plane network element, a second URR that corresponds to the downlink PDR, wherein the second URR triggers the user plane network element to report a third event, and the third event is that no uplink data packet of the first service is detected according to the first uplink PDR received at the user plane network element from the session management network element; and
in response to receiving the third event reported by the user plane network element, notifying the user plane network element to delete the first uplink PDR.

11. The session management network element according to claim 8, wherein
the operations further comprise:
sending, to the user plane network element, a third usage reporting rule (URR) that corresponds to a second uplink PDR, wherein the third URR triggers the user plane network element to report a second event, the second event is that an uplink data packet of the first service is detected according to the second uplink PDR, and the second uplink PDR is an uplink PDR that corresponds to the first service and that comprises the first packet filter set; and
the operation of sending the first uplink PDR to the user plane network element comprises:
in response to receiving the second event reported by the user plane network element, sending, to the user plane network element, the first uplink PDR that corresponds to the first service.

12. A communication system, comprising a session management network element and a policy control network element, wherein
the policy control network element is configured to send a first policy and charging control (PCC) rule to the session management network element, wherein the first PCC rule comprises downlink service data flow (SDF) information that corresponds to a first service;
the session management network element is configured to:
receive the first PCC rule from the policy control network element;
in response to the first PCC rule comprising reflective quality of service control (RQC) indication, generate, according to the first PCC rule, a first uplink packet detection rule (PDR) that corresponds to the first service; and
send, to a user plane network element, the first uplink PDR that corresponds to the first service.

13. The communication system according to claim 12, wherein
the first uplink PDR comprises a first packet filter set and a first quality of service flow identifier (QFI), wherein the first QFI is the same as a second QFI in a downlink PDR that corresponds to the first service, source information in the first packet filter set is the same as destination information in a second packet filter set in the downlink PDR, and destination information in the first packet filter set is the same as source information in the second packet filter set.

14. The communication system according to claim 12, wherein
the session management network element is further configured to:
send, to the user plane network element, a first usage reporting rule (URR) that corresponds to a downlink PDR that corresponds to the first service, wherein the first URR triggers the user plane network element to report a first event, and the first event is that a downlink data packet of the first service is detected according to the downlink PDR; and
in response to the session management network element receiving the first event reported by the user plane network element, the session management network element is configured to send, to the user plane network element, the first uplink PDR that corresponds to the first service.

15. The communication system according to claim 14, wherein
the session management network element is further configured to:
send, to the user plane network element, a second URR that corresponds to the downlink PDR, wherein the second URR triggers the user plane network element to report a third event, and the third event is that no uplink data packet of the first service is detected according to the first uplink PDR received at the user plane network element from the session management network element; and
in response to the session management network element receiving the third event reported by the user plane network element, notify the user plane network element to delete the first uplink PDR.

16. The communication system according to claim 13, wherein
the session management network element is further configured to:
send, to the user plane network element, a third usage reporting rule (URR) that corresponds to a second uplink PDR, wherein the third URR triggers the user plane network element to report a second event, the second event is that an uplink data packet of the first service is detected according to the second uplink PDR, and the second uplink PDR is an uplink PDR that corresponds to the first service and that comprises the first packet filter set; and
in response to the session management network element receiving the second event reported by the user plane network element, the session management network element is configured to send, to the user plane network element, the first uplink PDR that corresponds to the first service.

17. An uplink packet detection rule (PDR) generation method, comprising:
- sending, by a policy control network element, a first policy and charging control (PCC) rule to a session management network element, wherein the first PCC rule comprises downlink service data flow (SDF) information that corresponds to a first service;
- receiving, by the session management network element, the first PCC rule from the policy control network element;
- in response to the first PCC rule comprising a reflective quality of service control (RQC) indication, generating, by the session management network element according to the first PCC rule, a first uplink PDR that corresponds to the first service; and
- sending, by the session management network element to a user plane network element, the first uplink PDR that corresponds to the first service.

18. The method according to claim 17, wherein
the first uplink PDR comprises a first packet filter set and a first quality of service flow identifier (QFI), wherein the first QFI is the same as a second QFI in a downlink PDR that corresponds to the first service, source information in the first packet filter set is the same as destination information in a second packet filter set in the downlink PDR, and destination information in the first packet filter set is the same as source information in the second packet filter set.

19. The method according to claim 17, further comprising:
- sending, by the session management network element to the user plane network element, a first usage reporting rule (URR) that corresponds to a downlink PDR that corresponds to the first service, wherein the first URR triggers the user plane network element to report a first event, and the first event is that a downlink data packet of the first service is detected according to the downlink PDR; and
- receiving, by the user plane network element, the first URR,
- wherein the sending, by the session management network element to the user plane network element, the first uplink PDR that corresponds to the first service comprises:
  - in response to the session management network element receiving the first event reported by the user plane network element, sending, by the session management network element to the user plane network element, the first uplink PDR that corresponds to the first service.

20. The method according to claim 18, further comprising:
- sending, by the session management network element to the user plane network element, a third usage reporting rule (URR) that corresponds to a second uplink PDR, wherein the third URR triggers the user plane network element to report a second event, the second event is that an uplink data packet of the first service is detected according to the second uplink PDR, and the second uplink PDR is an uplink PDR that corresponds to the first service and that comprises the first packet filter set; and
- receiving, by the user plane network element, the third URR,
- wherein the sending, by the session management network element to the user plane network element, the first uplink PDR that corresponds to the first service comprises:
  - in response to the session management network element receiving the second event reported by the user plane network element, sending, by the session management network element to the user plane network element, the first uplink PDR that corresponds to the first service.

\* \* \* \* \*